(12) United States Patent
Guissin

(10) Patent No.: US 9,082,165 B2
(45) Date of Patent: Jul. 14, 2015

(54) INSPECTION OF REGION OF INTEREST

(75) Inventor: Rami Guissin, Beit Yanai (IL)

(73) Assignee: DVP TECHNOLOGIES LTD., Tel Aviv (IL)

( * ) Notice: Subject to any disclaimer, the term of this patent is extended or adjusted under 35 U.S.C. 154(b) by 97 days.

(21) Appl. No.: 13/700,758

(22) PCT Filed: May 31, 2011

(86) PCT No.: PCT/IL2011/000422
§ 371 (c)(1),
(2), (4) Date: Nov. 29, 2012

(87) PCT Pub. No.: WO2011/151821
PCT Pub. Date: Dec. 8, 2011

(65) Prior Publication Data
US 2013/0121546 A1 May 16, 2013

(30) Foreign Application Priority Data

May 31, 2010 (IL) .......................................... 206101
Jul. 14, 2010 (IL) .......................................... 206992

(51) Int. Cl.
*G06K 9/00* (2006.01)
*G06T 7/00* (2006.01)

(52) U.S. Cl.
CPC .............. *G06T 7/0012* (2013.01); *G06T 7/0081* (2013.01); *G06T 2207/10068* (2013.01); *G06T 2207/20104* (2013.01)

(58) Field of Classification Search
CPC ................ G06T 7/0012; G06T 7/0081; G06T 2207/10068; G06T 2207/20104
See application file for complete search history.

(56) References Cited

U.S. PATENT DOCUMENTS

| 5,799,111 | A |   | 8/1998 | Guissin |
| 5,848,198 | A | * | 12/1998 | Penn .............................. 382/276 |
| 6,760,486 | B1 | * | 7/2004 | Chiao et al. ................... 382/274 |
| 6,937,761 | B2 |   | 8/2005 | Thomas et al. |

(Continued)

FOREIGN PATENT DOCUMENTS

| FR | 2 825 817 A1 | 12/2002 |
| WO | WO 2007/031946 A2 | 3/2007 |
| WO | WO 2008/137912 A1 | 11/2008 |

OTHER PUBLICATIONS

Guissin et al., "Iso-Intensity Contours for Edge Detection," Report No. OUEL 1935/92, Robotics Research Group, May 1992.

*Primary Examiner* — Katrina Fujita
(74) *Attorney, Agent, or Firm* — Oliff PLC

(57) ABSTRACT

An imaging system for inspection of a region of interest. The system includes a data processing and analyzing utility responsive to input data indicative of one or more images of a region of interest and identifying one or more objects therein. The data processing and analyzing utility includes a visualization processor utility and a computer aided detection processor connected to the visualization processor utility. The visualization processor utility is configured and operable for receiving the input image data, converting the received image data into a desired representation, and decomposing image data of said desired representation into different components. The computer aided detection processor is configured and operable for scoring said components according to one or more predetermined scoring schemes, and classifying the blobs and contours according to a degree of match with reference data indicative of one or more predetermined objects.

28 Claims, 19 Drawing Sheets

(56) References Cited

U.S. PATENT DOCUMENTS

| | | |
|---|---|---|
| 7,039,239 B2 * | 5/2006 | Loui et al. ............... 382/225 |
| 7,120,293 B2 * | 10/2006 | Schoelkopf et al. ........ 382/162 |
| 7,471,815 B2 * | 12/2008 | Hong et al. ............... 382/128 |
| 8,208,700 B2 * | 6/2012 | Zhang et al. ............. 382/128 |
| 8,472,682 B2 * | 6/2013 | Guissin et al. ........... 382/128 |
| 2007/0019883 A1 * | 1/2007 | Wong et al. ............. 382/276 |
| 2008/0097186 A1 * | 4/2008 | Biglieri et al. ........... 600/407 |
| 2008/0226148 A1 * | 9/2008 | Gu et al. ................. 382/128 |

\* cited by examiner

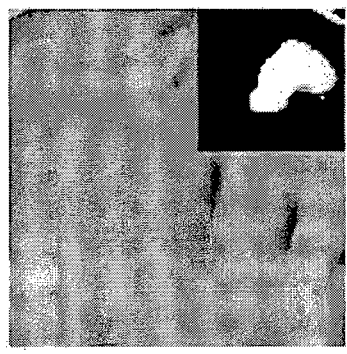  
Fig. 11j     Fig. 11k     Fig. 11l
Fig. 11m

INSPECTION OF REGION OF INTEREST

FIELD OF THE INVENTION

This invention generally relates to computer aided imaging techniques for automatic or semi-automatic inspection of a region of interest for identification of one or more objects therein.

BACKGROUND OF THE INVENTION

Typically, an image of a region or scene is produced in order to analyze it and extract desired data therefrom. In medical applications, for example, a probe captures images of a region of interest within a patient's body and image data is used for detection of anomalies, such as unhealthy tissue and polyps. In some other applications, image data is inspected to detect anomalies, such as fire, smoke, or pollution.

When imaging cluttered scenes in varying conditions (noise, clutter, dynamic range, dynamic motion), it is often difficult to perceive subtle anomalies and irregularities in such imagery. This is especially true in imaging situations where such conditions cannot be controlled in terms of signal to background, signal to noise and signal to clutter.

For example, the diagnostic performance in endoscopy, radiology, and ultrasound applications is often limited by low signal to noise levels. Specifically in endoscopy, tissue irregularities may appear as polyps, inflammations, hyper vascular structures, etc. Such indications may be in the superficial layers of tissue, as well as in deeper layers of tissue, which make them more difficult to visualize and detect.

GENERAL DESCRIPTION

This invention generally relates to a technique for computer aided imaging of a region of interest, enabling detection and identification of objects of interest in said region, such as abnormalities and/or irregularities. Such a technique may be used to improve the ability to perceive objects in a scene or accelerate a process to detect/identify such an object, with or without a man-in-the-loop. The present invention may be, for example, used in medical application including diagnostic and surgical imaging applications (e.g. endoscopy, radiology, ultrasound), as well as in other applications including electrooptical sensing applications and event detection (e.g. pollution detection, fire detection, hazard and obstacle detection).

There is thus provided an imaging system for inspection of a region of interest, the system comprising a data processing and analyzing utility responsive to input data indicative of one or more images of a region of interest and identifying one or more objects therein, the data processing and analyzing utility comprising:

a visualization processor utility configured and operable for receiving the input image data having a certain initial pixel representation, converting the received image data into a desired representation, and decomposing image data of said desired representation into different components according to certain parameters; and a computer aided detection processor connected to said visualization processor utility and configured and operable for scoring said components according to one or more predetermined scoring schemes to generate data indicative of blobs and contours of suspect regions and suspect blobs, classifying the blobs and contours according to a degree of match with reference data indicative of one or more predetermined objects, thereby enabling identification of said one or more objects in the image of interest.

The computer aided detection processor may comprise a pattern recognition utility.

The visualization processor utility may comprise a pixel processor configured and operable for performing said conversion, and a filter processor configured and operable for applying filtering to the converted image data thereby performing said decomposing into the components. The visualization processor utility may comprise one or more preprocessors, the preprocessor being configured and operable for signal enhancement. The preprocessor may comprise a filtering circuit, e.g. adaptive filtering. In some embodiments, the visualization processor utility is configured and operable for converting the image data of primary-color representation into at least one of a hue-saturation-luminance (HSL) representation and a hue-saturation-value (HSV) representation.

The system may also comprise a control monitoring unit connected to the visualization processor utility and to the computer aided detection processor for performing control of system parameters in a feedback control loop. The system may comprise a man machine interface connected to the control monitoring unit and enabling said control of the system parameters in accordance to user input.

The system may comprise data input utility configured and operable for receiving the input data indicative one or more images of the region of interest.

The data processing and analyzing utility may be configured and operable for processing one or more images at a given time and/or an image sequence.

According to another broad aspect of the invention, there is provided an imaging method for inspection of a region of interest, the method comprising processing and analyzing input data indicative of one or more images of a region of interest and identifying one or more objects therein, said processing and analyzing comprising:

converting the image data from its a given pixel representation into a desired representation;

decomposing image data of said desired representation into different components according to certain parameters;

scoring said components according to at least one scoring scheme, and classifying scored data according to a degree of match with predetermined reference data indicative of one or more objects of interest, thereby enabling identification of said one or more objects in the region of interest.

The scoring and classifying may comprise the following:

assigning a weighting factor to each of said components according to said at least one scoring scheme, and combining said components via a weighted function, such that a contribution of said components to an output of said weighted function depends on said weighting factors of said components, said weighting factors and weighted function being selected such that said output of the weighted function is indicative of a certain effect or object in the image; and using said output of said weighted function for generating blob data and/or contours data corresponding to one or more regions of the image, said blob and/or contour data being indicative of a suspected location of the object; and designating those blobs and/or contours that best correspond to the one or more objects of interest.

The method may comprise controlling operating parameters via a feedback loop.

The input image data may be indicative of at least one of the following: optical image, X-ray image, an ultrasound image, RF image.

The given pixel representation may be monochromatic or polychromatic. For example, the given pixel representation is a primary-color (RGB) representation. The primary-color (RGB) representation may be converted into at least one of hue-saturation-luminance (HSL) representation and hue-saturation-value (HSV) representation.

The decomposing process may comprise applying spatial filtering and/or temporal filtering to the converted image data. The spatial filtering may comprise adaptive band pass spatial filtering.

The method may comprise determining a plurality of weighting factors and weighted functions.

The generation of the blob data and/or contours data may comprise the following: for each pixel of the image, comparing said output of said weighting function to a certain threshold; and generating a binary map. The generation of the blob data and/or contours data may comprise contour generation of each blob. The designation of blobs and/or contours that best correspond to the one or more objects of interest may be implemented as follows: generating a blob list which comprises at least one blob feature of each blob; comparing said at least one blob feature with an object feature indicative of the object to be detected; and generating a candidate blob maps comprising only the blobs having said blob feature that is within a certain range of said object feature. The blob feature(s) may comprise at least one of the following: size, shape, contrast, texture, blob contour shape.

The method may comprise the following: generating a topographical map of said region of interest; verifying a validity of said designated blobs and/or contours by comparing at least one topographical feature of a location of said designated blobs on said topographical map to a corresponding feature of said designated blobs and/or contours; scoring said designated blobs and/or contours according to said comparison; and selecting said designated blobs and/or contours having a score within a predetermined range.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3b is a block diagram illustrating an embodiment of the system of FIG. 3a;

FIGS. 11a-11m depict image processing results used the detection of a polyp in a human lumen, as explained with reference to the embodiment of FIG. 5;

DETAILED DESCRIPTION OF EMBODIMENTS

Figure 1:
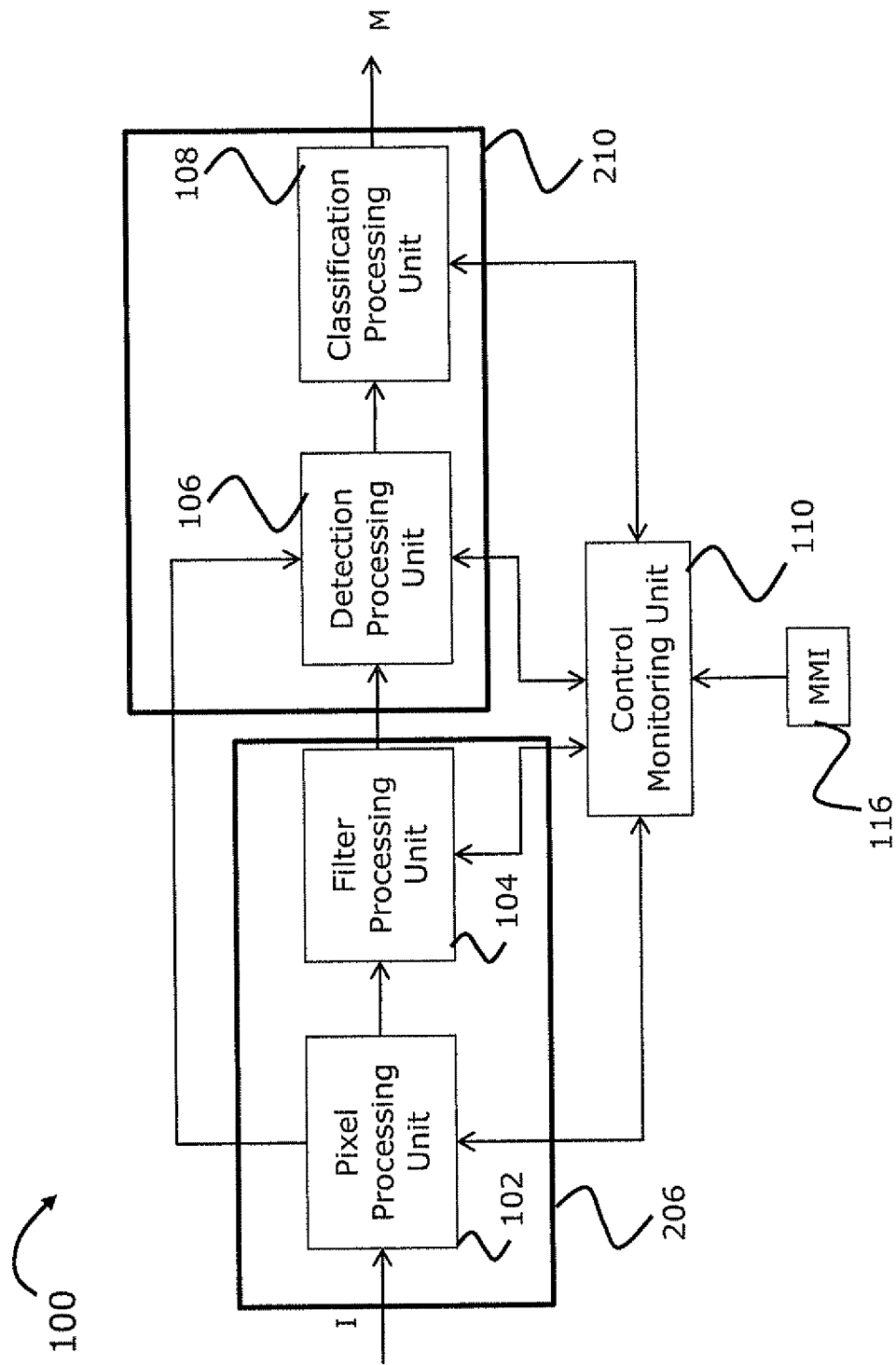
FIG. 1 is a block diagram of an example of data processing and analyzing utility used in an imaging system according to the invention for inspection of a region of interest.

FIG. 1 depicts an example of an imaging system 100 of the present invention. The system 100 is configured as a computer system capable of receiving and processing input digital data indicative of image data generated (on line or off line) by one or more imagers. The latter may be of any known suitable type, such as optical imager (e.g. camera), or imager based on collection of other type of radiation such as X-ray, ultrasound, etc. The system typically includes a data processing and analyzing utility connected to such other utilities as data input utility, data output utility (e.g. display), and memory utility, which are not specifically shown here. Thus, the system 100 in the figure is illustrated for simplicity by the elements/modules of the data processing and analyzing utility.

The data processing and analyzing utility 100 is configured and operable for receiving image data (from the data input utility) in an appropriate digital format and processing the image data to enable inspection of the region of interest. The processing includes visualization processing and computer aided detection processing, which will be described more specifically further below.

The image data is typically received with a given pixel representation (monochromatic or certain polychromatic, e.g. primary colors RGB). The visualization processing includes conversion/transformation of the received image data from the initial pixel representation thereof to a desired representation, and decomposition of the so-transformed data into different components (e.g. spectral components) according to certain parameters. Then, these components are subjected to computer aided processing including scoring of the components according to one or more predetermined (e.g. user selected) scoring schemes to generate data indicative of blobs and contours of suspect regions and suspect blobs, and applying to this data a certain pattern analysis processing (pattern recognition) to appropriately classify the blobs and contours. This may be done by designating those blobs and delineated contours that best correspond to (match with) the reference data indicative of searched-for objects (such as polyps and lesions in an organism, or polluted regions in a scene), or best correspond to anomalous behavior of such objects as compared to other candidate objects thereby designating blob outliers compared to other blob candidates.

Thus, as shown in the figure, input data indicative of image(s) I, typically in some color or monochromatic format, is received and processed sequentially by several processing units/modules of the data processing and analyzing utility 100 including a pixel processing unit (PPU) 102 and a filter processing unit (FPU) 104 forming together a visualization processor utility 206, and a detection processing unit (DPU)

106 and a classification processing unit (CPU) 108 forming together a computer aided detection processor 210, where all these utilities are connected to a control monitoring unit (CMU) 110 that may be controlled by a man machine interface (MMI) 116. The data processing and analyzing utility 100 may be configured for processing one or more images at a given time, and optionally for processing image sequences, whereby each of the units 102-110 may be extended to support temporal processing in addition to single image based processing.

The pixel processing unit (PPU) 102 is configured for performing the above-mentioned pixel representation transformation, such as a conversion/transformation from primary color representation, RGB (red, green, blue), to other parameters' representation, for example from RGB to HSL (hue, saturation, luminance) or from RGB to HSV (hue, saturation, value (often termed "brightness")) representation. The filter processing unit (FPU) 104 is typically a spatial filtering circuit, configured for processing image data (e.g. in RGB format, HSL format, etc.) by applying thereto a set of spatial filters that decompose this data into different components (planes) according to certain parameters (such as color and luminance, for example), to increase a contrast between certain image features and background. The detection processing unit (DPU) 106 receives the so-filtered data in the form of multiple different components from the FPU 104, and operates to score the different components according to one or more scoring schemes (predefined or created in response to user input), e.g. by assigning weighting factors thereto, and to generate blobs and/or contours of suspect regions and suspect blobs, e.g. by applying a thresholding technique to at least a part of the score data.

The scoring scheme may be based on absolute measures and criteria which are derived from the processed image, or from comparative measures that use a part or the entire image (or image sequence) in which the object of interest (e.g. lesion) appears. In some embodiments of the present invention, the DPU 106 also receives the transformed images from the PPU 102, generates iso-contours (contours along which a certain parameter does not change), and correlates the iso-contours to the filtered suspect regions and blobs.

The CPU 108 receives such blob/contour data (maps) from the DPU 106, and applies pattern analysis processing to designate those blobs and delineated contours that match with (best correspond to) the searched-for objects (such as polyps and lesions in an organism, or polluted regions in a scene), or those blobs and delineated contours that are characterized as anomalous regions as compared to other candidate regions in the image.

Optionally, the CMU 110 receives the output of CPU 108, as well as intermediate indicators from the other units, and enables a parametric control process that in turn controls the other units (a so-called feedback parametric control). For example, one such feedback parametric control includes the use of the blob map to vary the processing parameters of the entire process in a controlled fashion, thereby enabling the subsequent further investigation of a given blob map utilizing a multitude of processing parameters, preferably in an iterative manner. In this manner, a broad range of processing parameters can be used to analyze the validity of a specific blob (or set of blobs) in question.

The data processing and analyzing utility 100 may operate autonomously, according to a predetermined processing scheme. In some embodiments of the present invention, user input is used by data entry to the CMU 110 via an MMI 116, enabling a human operator to select specific parameters in order to investigate one or more suspect designations.

Figure 2:
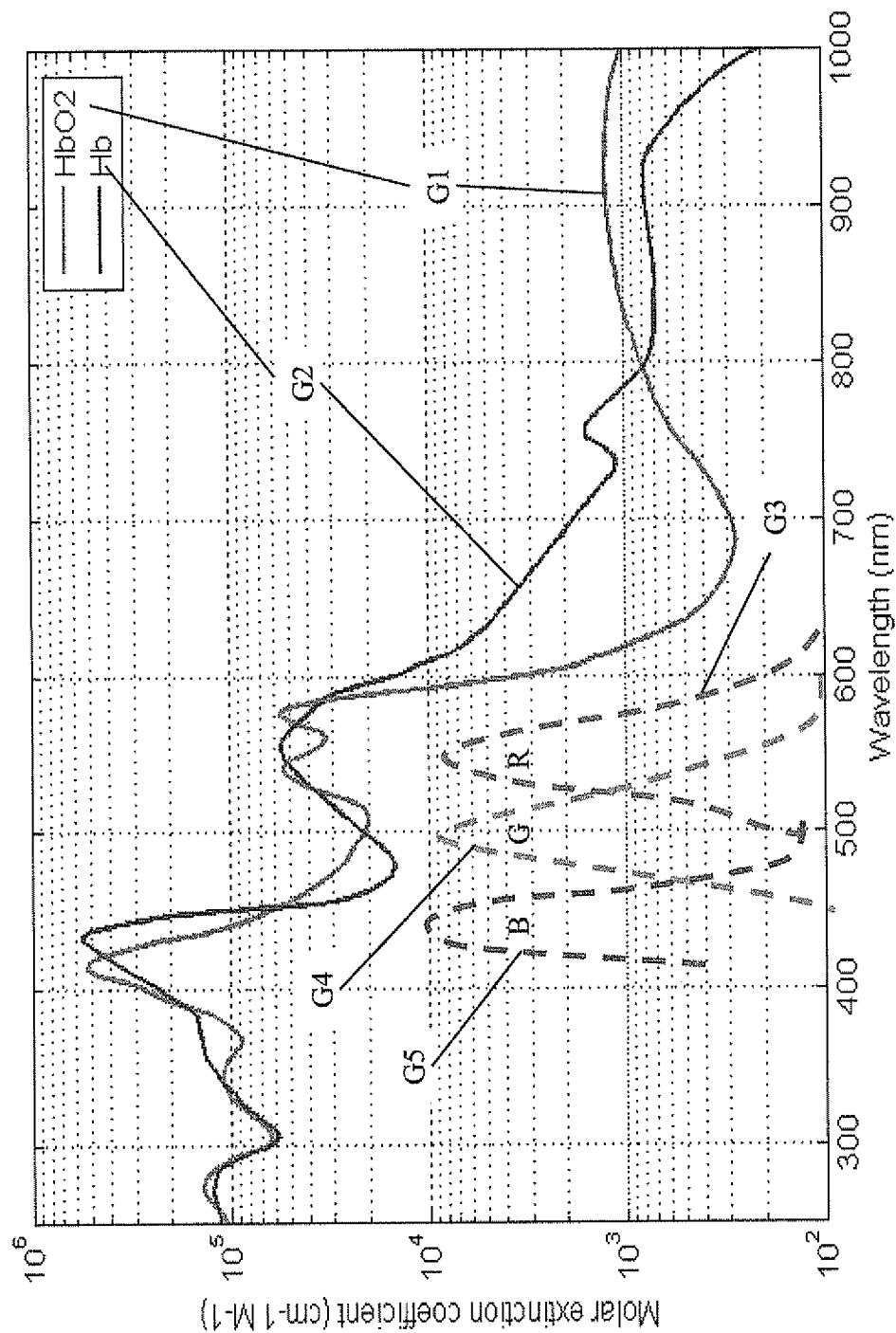
FIG. 2 illustrates spectral extinction coefficients of blood and principles of spectral discrimination via color conversion process used in the present invention for detection of objects of interest.

Reference is made to FIG. 2 illustrating the principles of color conversion process used in the present invention for detection of objects of interest, such as polyps in this specific but not limiting example. FIG. 2 shows the spectral extinction coefficient (Graphs $G_1$ and $G_2$) for hemoglobin and deoxyhemoglobin, and wideband RGB normalized sensitivities (graphs $G_3$, $G_4$, $G_5$) of color cameras such as CCD or CMOS, for wavelengths ranging between 0.3 μm-1.0 μm. In case of diagnosing tissue, as in video and capsule endoscopy, localized hemo irregular concentration and vascularization is known to indicate suspect disease and lesions.

It is known that differentiating between different tissues can be achieved based on spectral absorption characteristics. In some cases, narrow band illumination and sensing can serve to extract such fine differences for different wavelengths. However, this requires specialized narrow-band light sources and imagers, and accordingly might suffer from relatively low signal to noise. Wide-band sensing and imaging, such as in conventional white light video endoscopy, utilize integration of light over wide spectral ranges, thereby averaging narrow in-band absorption variations, and reducing the contrast ratio dA/A, where A is the spectral absorption of the tissue in such band. Adaptive digital filtering technology could provide the required processing sensitivity for detecting and delineating such low contrast image details in tissue, for example varying blood content, water, fat and chromophores.

Blood, for example, consists of two different types of hemoglobin: oxyhemoglobin (HbO2) which is bound to oxygen, and deoxyhemoglobin (Hb) which is unbound to oxygen. These two different types of hemoglobin exhibit different absorption spectra that are normally represented in terms of extinction coefficients, as shown in FIG. 2. The extinction coefficient of Hb has its highest absorption peak at 420 nm and a second peak at 580 nm. Its spectral profile then gradually decreases. On the other hand, HbO2 shows its highest absorption peak at 410 nm, and two secondary peaks at 550 nm and 600 nm. As light wavelengths passes 600 nm, HbO2 absorption decays much faster than Hb absorption. This is a reason for HbO2 blood having dominant as red color while Hb blood has dominant blue color. Spectral differentiation is therefore an important factor in detecting changes in tissue features, and this lends itself to various possible pixel color representations.

In a non-limiting example, the system of FIG. 1 may be used for detection/identification of polyps within a patient's body. The inventor has found that the following properties in polyps warrant the use of HSV representation of images in the polyp detection task.

With regard to hue (H), polyps are often "more red" than their surroundings. The comparative redness of polyps with respect to their surroundings may be explained by increased vascular activity and increased cellular growth activity within the polyp compared to surrounding healthy tissue. As hue spans the entire range of colors (i.e. from red through yellow, green, cyan, blue to magenta), a histogram (local or global statistical pixel distribution representation) of absolute hue values in the image has higher intensity in red color in the left part of the distribution, since hue values range cyclically between values of "0" to "1" ("0" corresponding to red, and "1"—to magenta). Therefore, the average hue value of a typical polyp is typically closer to zero (in the red region), while the average hue value of healthy tissue is farther than 0 (i.e. in the yellow/brown region). To quantify contrast between the region of interest and its surroundings, the average hue value of the region of interest is subtracted from the average hue value of the surrounding region. If the region of interest contains a polyp that is typically more red than its surroundings, such difference is negative, and in a graphical representation of the hue distribution, the difference resides in the far left (more negative) part of the hue difference distribution. On the other hand, if the region of interest has healthy tissue, such difference is less negative (and closer to 0) Therefore, the difference between the average hue value of a region of interest and the average hue values of a surrounding region can be indicative of whether the region of interest contains a polyp or whether the region of interest contains healthy tissue.

With regard to saturation (S), it is defined as the level to which the respective hue is pure, that is, for S=0 the pixel has no color and is only represented by its gray scale level, while for S=1 the pixel has its pure hue (or color). When the MAX and MN values of the RGB triplet are equal, i.e. R=G=B, S=0 and the pixel is of gray level intensity. As the (MAX-MN) difference of the RGB triplet increases, the saturation increases. Moreover, as the MAX of the RGB triplet increases, the saturation S value decreases. In other words, the saturation value is proportional to the "pixel color contrast". Tissue segments that have increased oxygenated or deoxygenated blood content, as compared to adjoining regions that have more fat or healthy tissue content, may be accentuated by the saturation parameter, due to the expected larger difference between the MAX and MIN values (e.g. the difference between the integral R value (integral of spectral plot $G_3$) and B value (integral of spectral plot $G_5$), that is due to the differences in the absorption coefficients of these bands. Polyps often have lower saturation values as compared to their healthy tissue surroundings, probably due to the relatively high reflectance of such polyps resulting in high values for MAX of the RGB triplet. When quantifying contrast between the region of interest to its surroundings, the average value of saturation for the region of interest is compared to that of the surroundings, and a difference is determined to clarify whether it is less than zero. More negative values of such difference are indicative of the presence of a typical polyp in the region of interest, while less negative values of such difference are indicative of healthy regions. Therefore, the polyp regions will result in negative values, ranging in the left (negative) part if the hue difference distribution.

Regarding luminance, the following should be noted. Mucosa tissue is characterized by high reflectance of illumination, and is assumed to have a diffusive reflectance component as well as a specular reflectance component. It may be assumed, that for certain imaging situations, the polyp would often reflect more light than healthy tissue surface. As luminance spans the entire range of intensity (i.e. from zero to maximum light in the scene), a histogram (local or global) of luminance values in the image would have the highest values in the right part of the distribution. Similarly, when quantifying contrast between the region of interest to its surroundings, the average luminance value of the region of interest and that of the surroundings are considered. More specifically, the average luminance value of the region of interest is subtracted from the average luminance value of the surroundings, and a difference is analyzed. More positive values of such difference are indicative of the presence of a polyp, i.e. the presence of polyps is determined when the difference resides in the far right (more positive) part of the luminance difference distribution.

As for topology of an illuminated region, it also can be determined by imaging, and the image data would be indicative of the existence of a polyp therein, Indeed, the reflectance characteristics of 3D surfaces, such as 3D polyp protrusions, typically generate an integral reflection peak in the local area of the surface whose normal is aligned with the illuminating ray impinging on said surface, and as the surface normal diverts from such alignment as the distance from the peak point increases, the reflected light drops off respectively. Iso-intensity (or iso-feature) contours may well capture the 3D general shape of the polyp compared to flat, creased or folded tissue surfaces.

RGB to HSV conversion (performed by the PPU 102 of FIG. 1) can be defined by the following equations:

$$H \begin{cases} \dfrac{\left(\dfrac{G-B}{MAX-MIN}\right)}{6} & \text{if } R = MAX & \text{eq. 1(a)} \\ \dfrac{\left(2 + \dfrac{B-R}{MAX-MIN}\right)}{6} & \text{if } G = MAX & \text{eq. 1(b)} \\ \dfrac{\left(4 + \dfrac{R-G}{MAX-MIN}\right)}{6} & \text{if } B = MAX & \text{eq. 1(c)} \end{cases}$$

$$S = \dfrac{MAX - MIN}{MAX} \qquad \text{eq. 2}$$

$$V = MAX \qquad \text{eq. 3}$$

In these equations, MAX and MIN correspond to the maximum and minimum values of the RGB triplet for each pixel. The hue (H), saturation (S), and value/brightness (V) magnitudes vary from 0 to 1, where H is cyclical (ranging between red, yellow, green, cyan, blue, magenta and back to red again), the saturation condition S=1 corresponds to the greatest saturation which means pure color, and the value condition V=1 corresponds to the highest intensity.

Figure 3A:
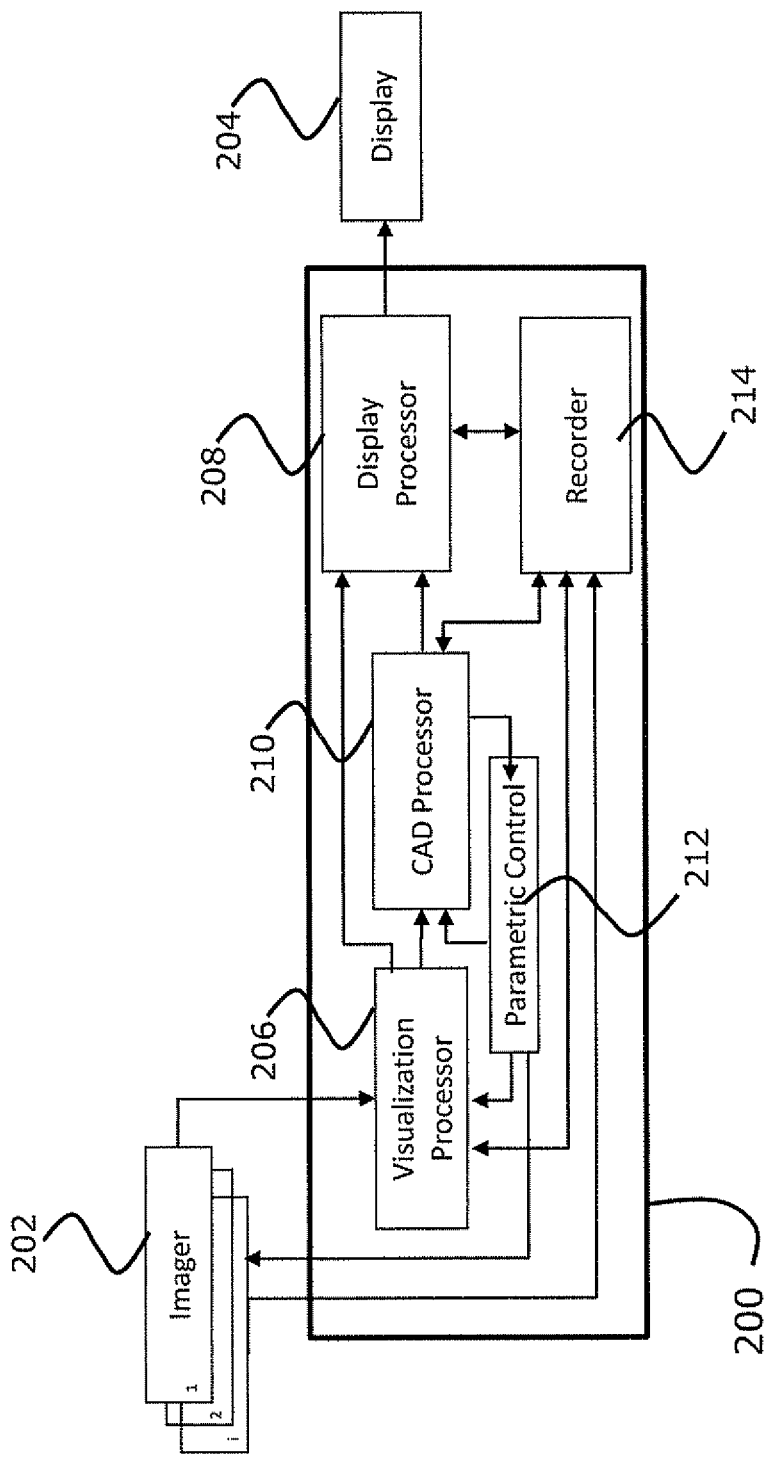
FIG. 3a is a block diagram of an example a system of the present invention.

Referring to FIG. 3a there is shown a block diagram of an example of the configuration of the system 200 of the present invention utilizing a data processing and analyzing utility generally similar to that illustrated in FIG. 1. The system 200 is associated with one or more imagers or images or storage device(s) 202, e.g. including such imager/storage as its constructional part or being connectable thereto (via wires or wireless signal transmission), and receives therefrom input image data (in digital format) indicative of image(s) of the region of interest. The system 200, its data processing and analyzing utility, processes said input data to identify one or more objects in the region of interest, and generates output data viewable on a display 204 which in turn may be integral with the system 200 or connectable thereto (via wires or wireless signal transmission). It should be understood that in case the system is to operate with remote data receiving/transmission modes, appropriate communication ports are provided and operative according to corresponding communication protocols.

The input data from the imager(s) 202 is received by a visualization processor 206 which is capable of performing the above described pixel representation conversion/transformation and filtering (e.g. spatial filtering), and whose output is connected to a computer-aided-detection (CAD) processor 210. The CAD processor 210 is capable of performing the above described detection (scoring) and image features' classification. In the present example, the output of the CAD processor and that of the visualization processor 206 are connected to a display processor 208 for designating areas of interest in an image and/or identifying an object in an image. The display processor 208 creates output image data which includes the region of interest as captured by the imagers 202 as well as designations of suspect objects in the region of interests. The image data from the display processor 208 can be appropriately presented on the display 204. Optionally, the system 200 includes a parametric control unit 110 connected to the input and output of the CAD processor 210 and also connected to the input of the visualization processor 206 and imager(s) 202. By this, the parametric control unit 110 analyses the designated blobs and/or contours in the region of interests and generates control signals to the visualization processor 206, imager(s) 202 and CAD processor 210, thus performing parametric feedback control, similar to that described above with reference to the CMU 110 of FIG. 1. Although the system 200 described in FIG. 3a can operate without said feedback, the option to connect the CAD processor 206 to the parametric control unit 110 enables, for example, to control spatio-temporally the parameters of the imagers' operation and operation of the visualization processor 206, while said parameters in turn affect the CAD processor's operation. This can be used to automatically tune the entire process of the image capture (e.g. camera exposure), image visualization (e.g. enhancement parameters), and CAD processes (e.g. detection parameters) to differently characterize desired effects and regions of interest in an image, as well as modify subsequently said parameters thereby spanning the range of said parameters for tuning and optimization purposes. This is particularly useful in cases where the desired image effects and areas of interest are not well defined, thereby providing an automated scoring system or with a man-in-loop scanning of a broad range of parametric settings in CAD aided detection applications. The parametric control unit 110 may operate automatically, according to a predetermined scheme, or may be configured for receiving a user input via an appropriate user interface (not shown), such as a keyboard, a joystick, a mouse, radiation receiver, etc.

Also, the system 200 may operate for storing data created by any one of the elements 202-212. This may be implemented by using the memory utility of the data processing and analyzing unit (not shown), or additional recorder utility 214.

Figure 3B:
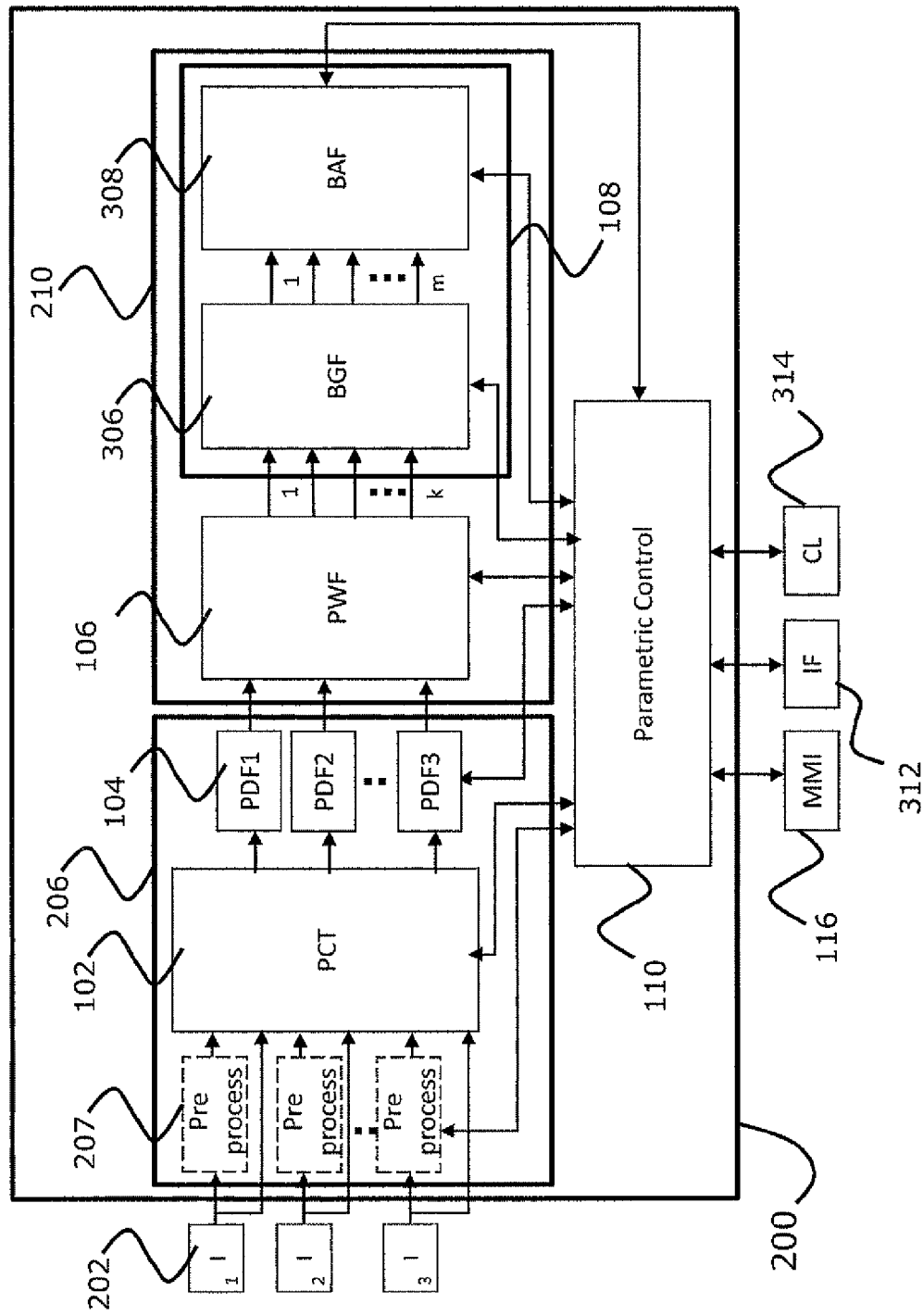

Reference is made to FIG. 3b which depicts a specific but not limited example of the configuration of the above-described system 200 of FIG. 3a configured for improving the detectability of an object in a region of interest. In the example of FIG. 3b, multiple image inputs are used, e.g. from a plurality of imagers/storage devices 202, whose inputs are fed into a Visualization Processor (VP) unit 206. In this example, the VP unit 206 includes a corresponding number of preprocessors, generally at 207 (the provision of which is optional), configured and operable for performing signal conditioning and enhancement or noise reduction (for further displaying the received images or parts thereof). Further provided in the VP unit 206 is a pixel conversion/transformation utility (PCT) 102 (configured generally similar to the pixel processing unit described above with reference to FIG. 1), and a filtering processor unit (PDF) 104 (configured generally similar to the filter processing unit described above with reference to FIG. 1). The preprocessor 207, if any, performs an enhancement process utilizing an appropriate filtering scheme, e.g. adaptive filtering scheme described in U.S. Pat. No. 5,799,111, and WO 2007/031946, both of which are assigned to the assignee of the present application, the disclosure of which is fully incorporated herein by reference. Some other examples of a filtering scheme suitable for use in unit 104 include spatial bandpass filters such as center-surround Difference of Gaussians (DOGs) or Difference of Boxes (DOBs), whereby weighted averages of surrounding (peripheral) regions of an image are subtracted from weighted averages of center regions.

The CAD processor 210 comprises a Pixel Weighting Feature (PWF) utility 106 (configured and operable generally similar to the detection processing unit described above with reference to FIG. 1), and a classification unit 108 configured as above, including Blob Generation Function (BGF) utility 306, and Blob Analysis Function (BAF) 308. Also, optionally provided in the system is a parametric control utility 110 connected to the VP unit 206 as well as to the utilities of the CAD processor 210. The parametric control utility 110 may be connected to a man-machine interface (MMI) 116, and/or an interface (IF) 312 of another system for example via a communication link (CL) 314.

The Pixel Composition Transformation (PCT) utility 102 is configured and operable for receiving image data either directly from one or more imagers/storage devices or from one or more preprocessors 207, and recomposes the pixel information to a different pixel representation that better suites the desired image effect, such that a certain effect/object appears more distinct in at least one such representation. For example, for a single image input comprising RGB, a color conversion from RGB to HSL or HSV may bring out information on a given effect or object, if such object has distinct difference in terms of its hue difference or saturation difference compared to the background. When obtaining multiple images of the same scene (e.g. using more than one image sensor), the multiple data pieces in the form of such new pixel representations may be further combined together by the PCT utility 102, in order to generate a combined image in which the object or effect appears more distinct. This improves the sensitivity of the CAD processor 210. For example, for an object that is known to be more red as well as more saturated as compared to normal background, the PCT utility 102 can generate a weighted sum of the RGB red plane and a filtered (e.g. high pass or band pass) version of the HSL saturation plane. It should be understood that such multiple images of the same scene/region of interest can be obtained using one or more image sensors observing the same scene, for example from different angles and distances, different spectra, different angular resolution, different imaging modalities (e.g. X-ray and optical; acoustic (e.g. ultrasound) and optical). The PCT utility 102 can thus provide a pixel weighting composition of such multiple inputs prior to applying the next stage of signal decomposition. For example, a lesion that is red and absorbing X-ray radiation may positively weight and add them.

An exemplary Pixel Composition Transformation (PCT) process carried out utilizing input from multiple preprocessors, generally at $VP_i$, may be described as follows:

$$PCT_j = F(VPa(Ia), VPb(Ib), \dots) \quad \text{eq. 4}$$

where I is represented by exemplary color planes Ia, Ib, Ic, and VPa, VPb, VPc, are different configurations of the preprocessors (e.g. adaptive or non adaptive noise reduction filters). A typical example in color endoscopic imaging is Ia=R, Ib=G, Ic=B, and VPa,b,c stand for respective preprocessing filters applied to each of the respective color planes.

The Pixel Decomposition Filter (PDF) utility 104 receives composed pixel information from the PCT utility 102 and applies spatial and/or temporal and/or spatio-temporal filtering in order to decompose the image signal into high-pass and preferably multi band-pass elements.

In an exemplary embodiment of the invention, the PDF utility 104 can be an Adaptive Band Pass spatial Filter (ABPF). One type of ABPF suited for use in some embodiments of the present invention is described in the above-indicated patent U.S. Pat. No. 5,799,111, assigned to the assignee of the present application. According to this example, a difference between two Adaptive Smooth Filters (ASF) having different smoothing parameters produces an adaptive bandpass filter.

The use of ABPFs enable enhancement and detection of connected image regions, with minimum sensitivity to the inter-region distance between adjoining differently (or similarly) regions, and without the need to define any expected dimensions of the image regions by defining a required degree of local contrast with respect to adjacent regions.

It should be understood that "adaptive" filtering actually signifies that special dimensions need not be determined a priori in order to employ the filter. Optionally, filters of this type can be implemented in one or two spatial dimensions, and in a temporal dimension as well.

The present invention is based on the inventor understanding that most sensing and imaging devices are not well calibrated over the entire sensing dynamic range, hence the absolute values of sensed/imaged pixels do not accurately represent the imaged scene, i.e. the sensing is not radiometrically or photometrically calibrated. For example, in endoscopy, this is often the case due to limitations of camera designs, illumination constraints, varying medium and tissue-light interaction. In some other applications, such as pollution detection or fire detection, imager, ambient, polluting and fire source/effect, and atmospheric conditions may all affect the imaging process. Processing image data via the PDF utility enables to provide data that is independent of such conditions, and is based on comparative and normalized measurements ("ac coupled") rather than absolute measurements. PDF band-pass outputs are therefore typically zero-mean signal statistical distributions, with the exception of the low-pass version.

In an exemplary embodiment of such ABPF, the filter can be achieved as follows:

$$ABPF(I)=ASF1(I)-ASF2(I) \quad \text{eq. 5}$$

where I is the received image representation from the PCT utility 102, ASF1 is an adaptive smoothing filter using a fine smoothing setting and ASF2 is adaptive smoothing filter using a coarse smoothing setting. The fine smoothing setting may in this case reflect a locally computed image standard deviation of the minimal local contrast of interest, while the coarse smoothing setting may reflect a locally computed image standard deviation of the maximal local contrast of interest, such that the computed difference ABPF reflects the signal content falling within the fine to coarse deviation range. Optionally, ASF1 and/or ASF2 is a multi-dimensional multi-directional adaptive spatial filter as disclosed in the above-indicated patent U.S. Pat. No. 5,799,111.

In some other exemplary embodiments of such ABPF, the filter can be achieved as follows:

$$ABPF(I)=ASF1(I)-ASF2(ASF1(I)) \quad \text{eq. 6}$$

where the ASF2 filter is applied to the output of the filter ASF1 applied to image representation I.

In yet other exemplary embodiment of the invention, the PDF can also be in the form of one or more Non-adaptive spatial Band Pass Filter (NABPF). Such NABPF may utilize for example Difference of Gaussians (DOG), or Difference of Boxes (DOB). Optionally, filters of this type can be implemented in one or two spatial dimensions, and in temporal dimension as well.

A NABPF may be implemented in a similar manner as the ABPF filters described above:

$$NABPF(I)=NASF1(I)-NASF2(I) \quad \text{eq. 7}$$

and $$NABPF(I)=NASF1(I)-NASF2(NASF1(I)) \quad \text{eq. 8}$$

where NASF1 is non adaptive smoothing filter (e.g. Gaussian or box) using fine smoothing parameter and NASF2 is non adaptive smoothing filter (e.g. Gaussian or box) using coarse smoothing parameter, resulting in Difference of Gaussians (DOG), or Difference of Boxes (DOB).

The Pixel Weighting Feature (PWF) utility 106 receives one or more output signals from the PDF utility, and operates to assign a weighting factor to each such PDF output, and recombine the components of the PDF output via a weighted function. The so-obtained weighted data is indicative of a certain effect in the image. For example, the weighting factors and the weighted function might maximize scoring of a desired image effect or characterized image region. The weighted function may be model-based, which in turn requires a-priori knowledge of the effect to be detected, or various weighting alternatives may be computed, hence increasing the probability that at least one of the respective weighted functions will provide a high enough score to be distinct as compared to what is considered background.

For example, a specific class of polyp (say class 1) in a human colon may be characterized by the following parameters: a local spatial difference in hue (towards the red; PDF(H)<0), local spatial difference in saturation (towards high saturation; PDF(S)>0), and local spatial difference in luminance (towards a positive contrast; PDF(L)>0). For such a polyp detection task, an example of a PWF function that represents the output of the PWF utility 106 would be:

$$PWFk=W(H) \cdot INV(PDF(H))+W(S) \cdot PDF(S)+W(L) \cdot PDF(L) \quad \text{eq. 9}$$

where the weighting factors W(H), W(S) and W(L) are determined on the basis of nominal relative statistics of such polyps, thereby normalizing the relative contribution of the respective feature. The PDF(H) is inversed in order to reflect the red local difference (that is represented by the left part of the zero-mean PDF(H) distribution).

Typically, due to the extensive variability of underlying parameters in the imaging process, it is not always known or can be modeled in advance which PCT, PDF and PWF functions should best be used for a given situation. Therefore, a multiple set of PCT, PDF and PWF functions can be utilized in order to capture such results which best standout; that is, the CAD utility's task in question is to detect statistical outliers. By normalizing said statistics via appropriate weighting functions, one can compare different PWF outputs in seeking the most significant outliers and designating them accordingly. For example, the PWF utility 106 may include a search circuit/module which utilizes multiple weighting functions such that the maximum PWF score is sought for a given region of interest. Combining several PWF functions in seeking the highest outlier indication, may be as follows:

$$PWFmax=MAX(PWF1,PWF2,\ldots,PWFk) \quad \text{eq. 10}$$

For example, each PWF1, 2, 3, ..., k is computed for the entire image, and the pixel values for each are stored in temporary memory. Then, for each PWFk, the mean and standard deviation of said PWFk stored values are computed, and used to normalize said values such that the mean is subtracted from all values and the zero-mean values are normalized with respect to the standard deviation. Then, for each pixel, the maximum value of all normalized PWFk values is selected and a new image map of maximum values is formed. When this image map is fed into the subsequent unit 108 for blob analysis, such maximum values are expected to generate minimum false alarms as the maximum PWF values have been selected.

The Blob Generation Function (BGF) utility 306 receives data pieces generated by and output from the PWFs and applies morphology and thresholding operations onto the global PWFs histograms in generating multiple binary maps. In a non-limiting example, for each pixel, the output of the weighting function is compared to a predetermined threshold. The threshold may be chosen according to the properties of the object or effect that is being searched for. According to such comparison, a binary map is generated for each weighting function. In a non-limiting example of a binary map, pixels that have a weighting function above the threshold (i.e. pixels indicating an image effect that is distinct from a background) are given the numeral 1, while pixels that have a weighting function below the threshold are given the numeral 0. The numerals 1 and 0 can be graphically represented by white and black colors, respectively. A blob is a connected set of pixels represented by the numeral 1 that are combined to represent a spatial or spatio-temporal object that is analyzed later in terms of a set of image measurable features.

The Blob Analysis Function (BAF) utility 308 receives binary map data from the BGF utility 306 and processes this data to provide blob lists, which include the computed features of each blob, such as shape, size, contrast, texture, contour etc. The BAF utility 308 then scores such features by comparing them with a set of features that represent desired image effects or objects to be detected, and generates a candidate blob map which includes the blobs with the highest scores. The candidate blob map is the output of the CAD processor 210.

The parametric control utility 110 which may be used in the system receives the output of the BAF utility 308 as well as intermediate indicators from the other utilities (visualization processor utility 206 and the utilities of CAD processor 210), and performs a spatio-temporal parametric control process that in turn controls operation of all such utilities. Such parametric control may be applied to the entire image data or may be limited to a specific region in the image, where a suspect blob was designated calling for additional parametric analysis.

For example, such feedback parametric control may utilize the blob map to vary the processing parameters of the entire process in a controlled fashion, thereby enabling the subsequent further investigation of a given blob map utilizing a multitude of processing parameters, preferably in an iterative manner. In this manner, a verification process is provided spanning a broad range of processing parameters, and resulting in a capability to further investigate the validity of a specific blob (or set of bobs) in question.

An example for such iterative parametric feedback approach spanning the range of relevant processing parameters is a still image (e.g. radiology) or image sequence (e.g. angiography) that are used for medical diagnostics. For the still image case, an image sequence can be generated from said still image, by the subsequent changing (by the parametric control utility) of processing parameters of the VP utility 206 and/or the CAD processor 210, such that consecutive images in the sequence are slightly modified with respect to each other, thereby enabling a smooth transition between parameter settings. This gives rise to a convenient visualization spanning a relevant range of processing and analysis. The parametric control utility 110 may be controlled by a Man Machine Interface (MMI) 116, whereby a user can pause the image sequence generation, where he perceives a suspect finding. Other modules of the parametric control utility 110, may include an Interface (IF) to another system, or a Communication Link (CL) to such other system. An exemplary image sequence created by changing processing parameters of a single still will be described below with reference to FIGS. 9a-9f.

Figure 3C:
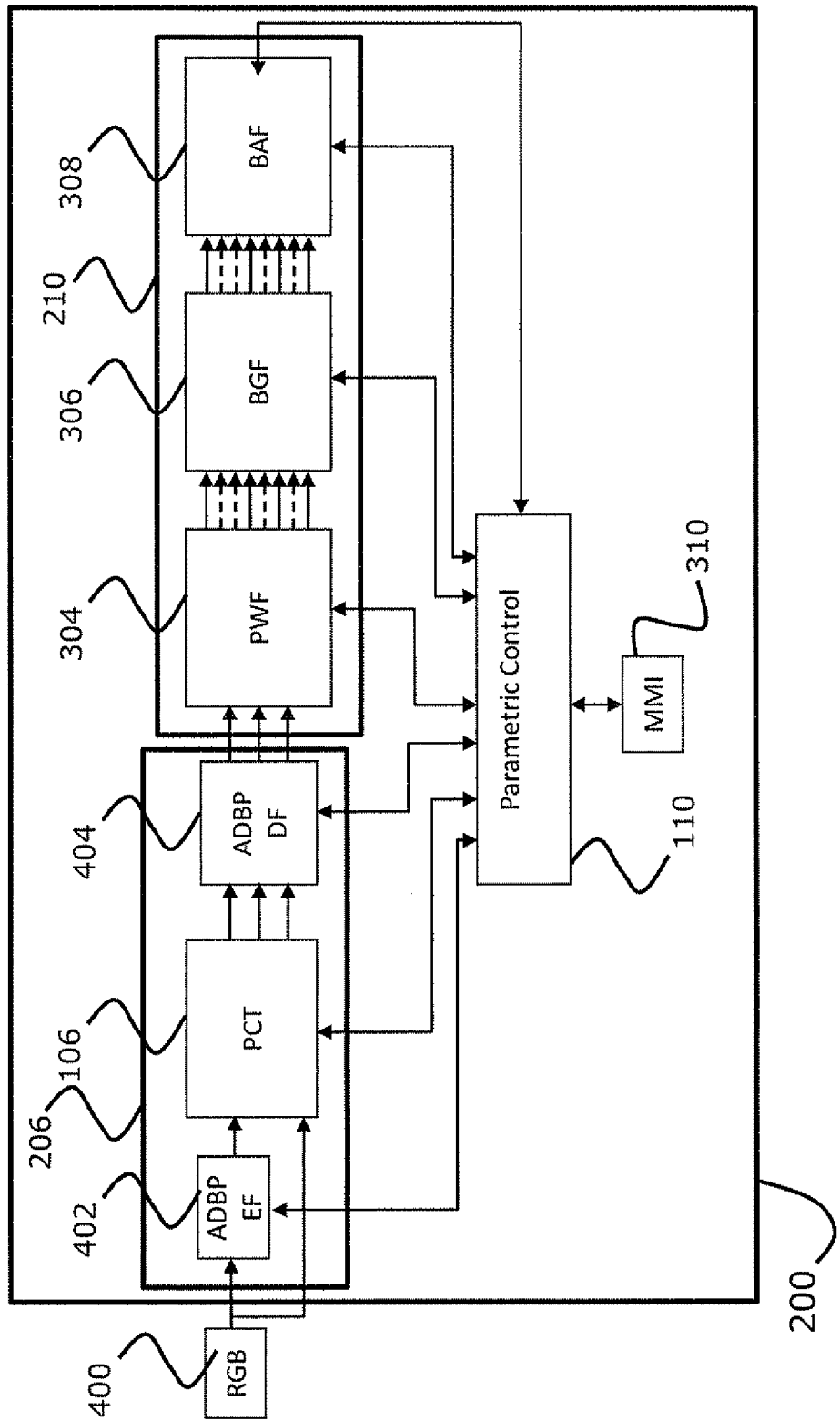
FIG. 3c is a block diagram illustrating an embodiment of the system of FIG. 3b.

Reference is made to FIG. 3c which depicts a specific but not limiting example of the configuration of the above-described system, whereby an input RGB image 400 from an imager or storage device is processed first by a visualization processor via an ADBP enhancement filter 402 (e.g. configured as described in the above-indicated patent U.S. Pat. No. 5,799,111). The filtered image data is then fed into a PCT utility 106 that converts/transforms the image data into a different pixel representation, e.g. HSL format, as described above. Then, a second ADBP filter 404 of a PDF utility 104 is applied to the H,S,L planes utilizing processing parameters that remove a level of image detail and image background, and retaining a band-pass representation that enhances spatial objects in a range of local contrasts. More than one ADBP filter may be used (being a part of the visualization processor 206 and/or the PDF utility 104) to address a wider range of objects in questions. In this example, the PWF utility 106 utilizes four normalized weighting functions, namely (L+H+S), (L+H−S), (L−H+S), and (L−H−S). The BGF utility 306 incorporates a minimum morphology operator with for example a radius of 2 pixels (MIN2), prior to applying a 1 sigma threshold (THR1) (where sigma is the standard deviation), thereby generating a binary map from which a blob list is generated for further analysis by that blob map. The BAF utility 308 utilizes shape, contrast, hue and saturation to further analyze the blobs.

According to some embodiments of the current invention, the CAD processor 202 capabilities are utilized for the detection of specific types of liquids and detection through turbid medium (e.g. water, blood, bile etc) that are typically faced, for example, in endoscopy imaging applications.

For example, the inspection of an endoscopy RGB image scene with high reflectance, specular reflecting liquid (e.g. water) may be performed by the above-described system 200 operating according to the following scheme. As specular reflections are often characterized by strong reflections in all 3 R,G,B planes, the PWF utility 304 of FIGS. 3b and 3c performs multiplication or addition of the three pixel values (R×G×B or R+G+B), with or without ADBP filters (402 and 404 of FIG. 3c). The BGF utility 306 performs a global statistical threshold operation using the global histogram of the PWF result, and the BAF utility 308 performs blob analysis for designating liquid suspected areas (as shown, for example, in FIG. 7b) and saturated areas (as shown, for example, in FIG. 7c).

As indicated above, some embodiments of the current invention use the CAD processor's capabilities for the detection of saturated areas of images. The variability of received light (from the illuminated scene) at the imaging lens aperture is inversely proportional to the fourth power of the distance between the imager and the region of interest (e.g. imaged tissue). For example, for small endoscopes in small lumen that illuminate the imaged scene, a close surface may be located at a distance of 1 mm and a longer distance may be 10 mm. The dynamic range of the received light from two such surfaces in a given imaged scene is on the order of $10^4$ which is considerably higher than what accessible, cost effective CCD or CMOS cameras can provide. Using the CAD processor 210 as described above, the degree of the problem can be detected and analyzed. In this manner, the imaging process may be controlled by controlling the camera and illumination exposure.

Figure 6A:
FIGS. 6a-6c illustrate image processing results used for detecting saturated regions in an image, according to the system of FIGS. 3a-3c.
Figure 6B:
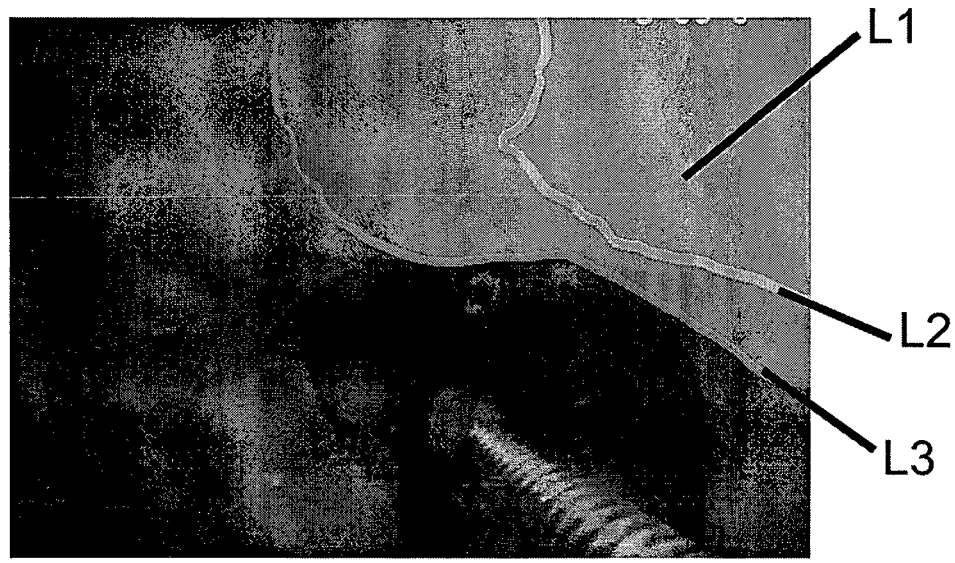
Figure 6C:
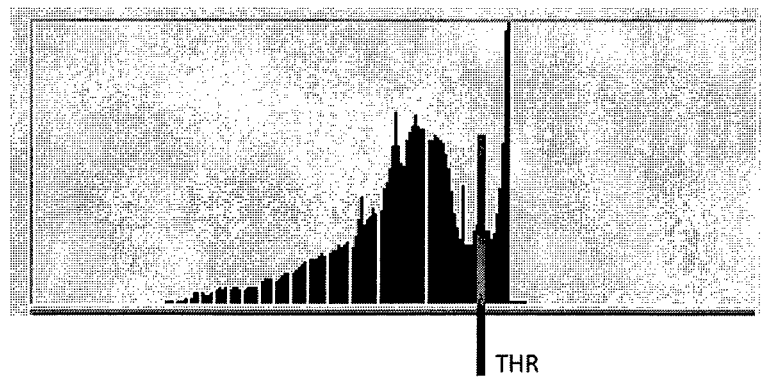

This process is exemplified in FIGS. 6a-6c which illustrate image processing results used to detect saturated regions in the image, according to the above-described technique of FIGS. 3a-3c. FIG. 6a depicts an endoscopy RGB image of the stomach with a saturated image area in the top right, whereby such saturated region in the image has lost at least some detail information, such as for example tissue texture and possible lesions and anomalies. FIG. 6b illustrates a processed image according to the technique of FIGS. 3a-3c, in which the original endoscopy RGB image after processing includes delineated regions in accordance with their colors, whereby lines L1, L2 and L3 delineate the respective blue, green and red image regions that are saturated. FIG. 6c illustrates a statistical histogram of the image (e.g. either red, green or blue) following a typical automatic gain control (AGC) operation which typically applies a stretching operation (gain) on the image signal as well as an offset (bias) operation. The histogram analysis process may be as follows: Determination whether there is an upper histogram mode that indicates saturation, and if yes then applying an appropriate threshold to delineate the entire set of pixel regions (blobs) at which such saturation took place. The upper histogram mode (population concentration), i.e. above the threshold THR, is indicative of saturation as the right tail part of the said upper mode has a sharp falloff (clipping) as compared to the left tail of the said mode. This indicates a saturation effect, and the threshold THR is applied such that it includes the entire mode (including the left tail of the mode) in generating the binarized blobs.

In generalizing the above, the approach may be used similarly to detect both upper histogram mode clipping (indicating localized image saturation) as well as lower histogram mode clipping (indicating localized image cutoff). In yet another embodiment, the technique described above with reference to FIGS. 3a-3c is applied to an endoscopy RGB image of a scene with cutoff and saturation problems, by utilizing the CAD processor 210 operation (configured as described above), whereby the imager is controlled by the parametric control utility 110 to undergo an AGC and Gamma transformation. The ability to sense such cutoff and saturation is based on a histogram analysis of clipped upper and lower modes that are at the extreme ends of the image histogram. If such upper clipped modes are detected on the high end, then exposure and illumination must be reduced. Otherwise, if a lower histogram clipped mode is detected, then exposure and illumination may be increased. Generally, histogram modes are to appear more into the middle of the dynamic range of the display image histogram, whereby neither the lower nor the upper mode is clipped, that is both left and right tails of the histogram do not exhibit clipping.

Such control of several imaging parameters based on global image histogram analysis, including for example illuminator output, camera exposure, camera iris, etc., are limited in that they affect the entire field of view. If exposure is increased when detecting lower cutoff modes, then it may generally result in saturated upper modes as well, while if upper modes are detected thereby reducing exposure and as a result possibly impacting the signal to noise ratio (SNR) in the image, especially SNR of those pixels receiving lower light.

An additional embodiment of this invention provides for the CAD processor 210 control of the camera frame rate (and exposure time when limited by the frame time), whereby a higher frame rate is collected and summed in a spatio-temporally adaptive manner to provide improved SNR in lower light areas while simultaneously minimizing saturation in image areas of stronger light. Optionally, decimating digitally from the higher frame rate to a lower display frame rate, while applying a digital dynamic range compressor (DRC) to the said digitally accumulated image may be used to further improve SNR. In other words, a high dynamic range image may be best sampled and displayed by sampling digitally the scene at a higher frame rate, at say 120 Hz (i.e. lower exposure time), and decimating such frames temporally, thereby reducing the frame rate to regular video frame rate of say 30 Hz, yet when decimating the consecutive frames we retain the full dynamic range using more bits in the digital representation of each decimated pixel.

The control of the frame rate may be done, for example by feeding blob information in real-time to the parametric control utility 110, utilized to adaptively control an imager to increase the frame rate (and subsequently decrease the exposure, where applicable), in order to avoid such saturated image regions. As the frame rate and exposure times are dynamically modified, an additional Accumulating Frame Buffer (AFB) may be used to compensate for such real-time changes, thereby resulting in smooth temporal transitions and Dynamic Range Compression (DRC). Such frame rate and exposure control is often available when using CMOS imaging devices. For example, when increasing a typical video frame rate from 30 Hz to 120 Hz, the signal dynamic range in each frame will typically decrease by the same factor, thereby avoiding saturation effects. The AFB with a sufficient digital dynamic range is then used to digitally add up subsequent image frames, thereby decimating the frame rate back to 30 Hz, albeit without saturations. A DRC is then used to digitally compress the image dynamic range to typically 8 bit in order to enable display. The DRC may be based on ADBP filtering as described in the above-indicated patent U.S. Pat. No. 5,799,111.

Figure 4:
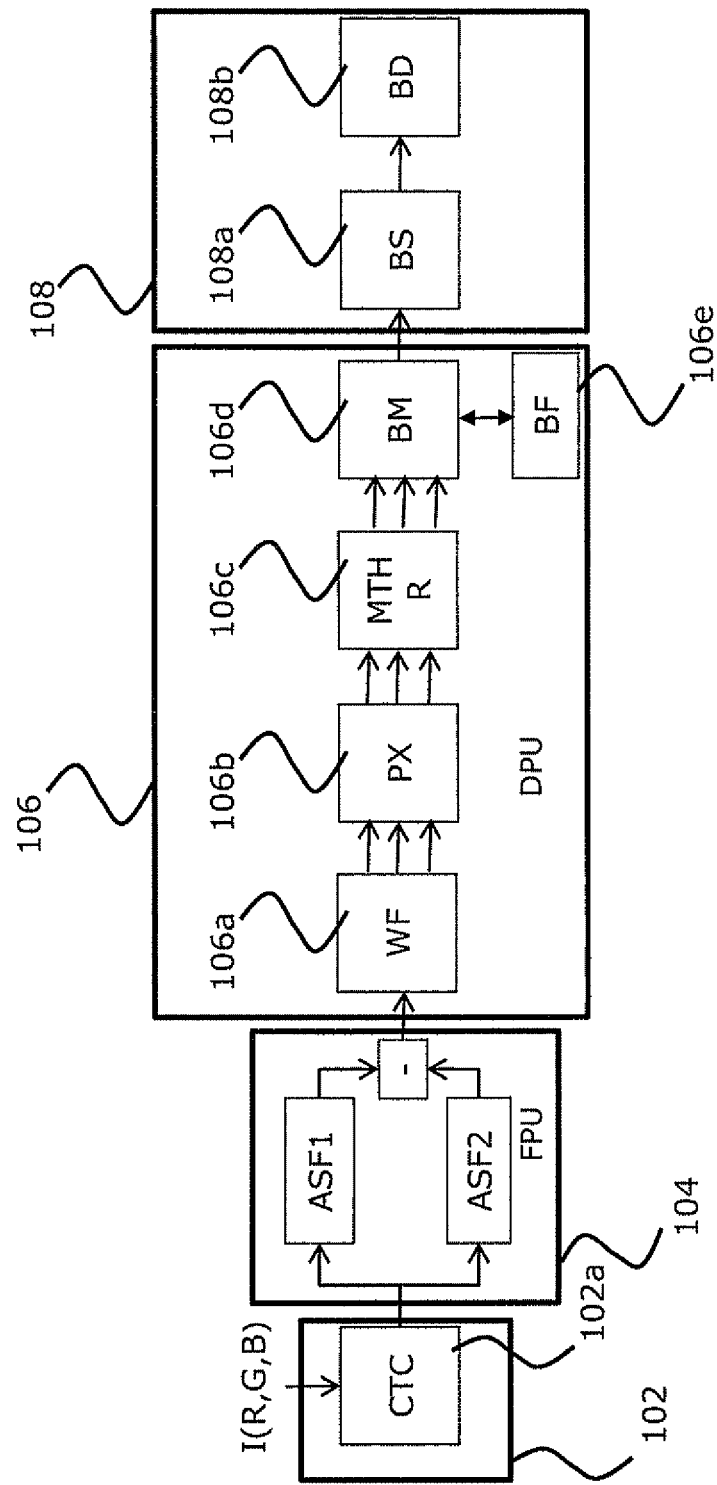
FIG. 4 is a block diagram illustrating an example of the system of the current invention, configured for polyp detection in video- and/or capsule-based endoscopy applications.

Reference is now made to FIG. 4 showing an example of the system of the current invention, whereby the four processing units described in FIG. 1 are configured for polyp detection in video- and/or capsule-based endoscopy applications. While the exemplified embodiment applies to the process operating on a single image, it can further be extended to operate on a sequence of images.

As shown in FIG. 4, image data/signal I, e.g. in RGB format, is fed into a color transformation and conditioning (CTC) unit 102a of a pixel processing utility (PPU) 102 (of a visualization processor), and the RGB triplet is converted to e.g. HSV format. Each H,S,V image plane feeds into the FPU 104 (of the visualization processor), where a spatial filter (SF) decomposes the image plane into preferably band-pass components, comprising an ABPF=ASF1(x)−ASF2(x).

The H,S,V outputs, which are zero-mean distributions, capture local differences of adjoining image regions, and are fed into the DPU 106, where a weighting function (WF) module 106a weights them, such that the weighted function maximizes a scoring of a desired image effect or characterized image region. The weighting function may be model-based, which in turn requires a-priori knowledge of the effect to be detected, or various weighting alternatives may be computed hence increasing the probability that at least one of the respective weighted functions will provide a high enough score to be distinct compared to what is considered background.

A linear spatial filter (SF) is typically represented by the following equation:

$$O(x) = \sum_i a_i \cdot I(x-i) + \sum_j b_j \cdot O(x-j) \qquad \text{eq. 11}$$

Where:
$O(x)$=output at pixel x
$a_i, b_j$=constant operands
$I(x)$=Input at pixel x The difference between two SFs with different operands can result in a band-pass filter (BPF). In detection applications, BPFs are typically Difference of Gaussians (DOG) or Difference of Boxes (DOB) filters, that are typically finite impulse response (FIR) filters with $b_j=0$. Optionally, filters of this type can be implemented in one or two spatial dimensions, and in a temporal dimension as well.

A linear BPF may be typically implemented as follows:

$$BPF(x)=O1(x)-O2(x) \qquad \text{eq. 12}$$

where O1(x) is a fine smoothing filter with typically small spatial averaging kernel, and O2(x) is a coarse smoothing filter with typically larger spatial averaging kernel.

Such FIR BPFs have inherent limitations in detection applications. The BPF kernel size and smoothing operands effect the detection sensitivity to a given size object. When the size of the desired objects is unknown, one needs to apply multiple size BPF kernels in order to detect such objects, in addition to combining them logically in various scale-space configurations.

In an exemplary embodiment of this invention, the SF is an infinite impulse response (IIR) filter with $b_j$ non-zero, and preferably $a_j$ and $b_j$ being adaptive, resulting in an adaptive SF (ASF). The ASF, which is particularly effective in the current detection task, is depicted in FIGS. 6a-c represented by the following equation:

$$O(x) = \sum_i K_i[A_i(I(x), I(x-i))] \cdot I(x-i) + \sum_j K_j[A_j(I(x), O(x-j))] \cdot O(x-j) \qquad \text{eq. 13}$$

Where:
O(x)=output at pixel x
ai,bj=constant operands
A[ ]=local operation
K[ ]=adaptive function of A[ ]
I(x)=Input at pixel x
and an adaptive BPF (ABPF) may be typically implemented as follows:

$$ABPF(x)=O1(x)-O2(x) \qquad \text{eq. 14}$$

where O1(x) is a fine smoothing adaptive filter with typically small spatial kernel and fine adaptive recursive parameters, and O2(x) is a course smoothing filter with typically larger support kernel and coarser adaptive recursive parameters. A simplified configuration of the above ASF is described in the above-indicated patent U.S. Pat. No. 5,799,111.

The weighting function can be determined as:

$$WFj = Wj(H)*SF(H)+Wj(S)*SF(S)+Wj(V)*SF(V) \qquad \text{eq. 15}$$

where the jth weighting function WFj comprises three components WFj=Wj(H), Wj(S), Wj(V), one for each plane.

As described above, for example, a specific class of polyp (e.g. class 1) in a human colon may be characterized by a local difference in hue (towards the red; SF(H)<0, local difference in saturation (towards low saturation; SF(S)<0), and local difference in luminance (towards a positive contrast; SF(V)>0). For such a polyp detection task, a candidate WF function would be WF1=-1,-1,1. This WF only weights the polarity of each H,S,V plane, and does not weight the planes in terms of their respective SF output intensities. H,S,V distributions standard deviations typically vary considerably, and this will affect the WF result. If, for example, the CTC function stretches the respective histograms of the H,S,V planes prior to SF processing, then effectively the three planes can be assumed to equally affect the result, which is one preferred embodiment of this invention.

As noted above, the S values tend to depend strongly on the R,G,B intensities of respective pixels. A second WF2 may therefore be applied with WF2=-1,1,1 thereby maximizing such situation's weighted score. A third WF3 may address the fact that some polyps tend to reverse their saturation values within the polyp where the R,G,B values vary greatly as a function of strong shading effects of, for example, a 3D protruding polyp structure. In such a case, WF3=-1,SIGN,1, where SIGN signifies the absolute value of the respective S value. Other WFs may include for example WF=0,0,1 or WF=-1,0,1 etc.

Typically, due to the extensive variability of underlying parameters in the imaging process, it is not always known or modeled in advance, which CTC, SF and WF should best be used for a given situation. Therefore, one approach is to utilize a multiple set of CTC, SF and WF configurations and settings, in order to capture such results which best standout; that is, the CAD task in question is to detect statistical outliers, and by normalizing the said statistics by utilizing the weighting functions one can compare different WF outputs accordingly in seeking the most significant outliers and designating them accordingly. For example, WF may also combine several WFs in seeking the highest outlier indication, for example:

$$WFk=MAX(WF1,WF2,\ldots,WFj) \qquad \text{eq. 16}$$

or $$WFk=SUM(WF1,WF2,\ldots,WFj) \qquad \text{eq. 17}$$

Another example may be a multiple input image input, for example from two sensors imaging the same scene, for example from different angles and distances, different spectra, different angular resolution, different imaging modalities (e.g. X-ray and optical) etc, whereby the WFk can provide a pixel weighting composition of such multiple inputs.

A next processing step performed by the DPU 106 in the embodiment of FIG. 4 is a global posterization (PX) histogramic operation 106b, whereby the WF output image representation is quantized to a desired number (X) of intensity levels spanning the entire dynamic range of the WF output, for example by stretching the histogram to span 256 levels, and then quantizing the histogram to X quantized values where typical values for X=4 or 8 or 16.

The posterized image planes are fed into a multi threshold (MTHR) function 106c, utilizing one or more thresholds for generating binary bitmaps of various levels. The MTHR function may also include a noise reduction or smoothing operation that generally conditions the posterized planes prior to thresholding or thereafter.

Also, in the DPU, a blob map (BM) function 106d generates blobs from the MTHR bitmap, each blob being characterized by a blob feature (BF) function 106e, e.g. blob intensity, blob area, blob shape, blob contour topology etc. A blob is a connected set of pixels that are combined to represent a spatial or spatio-temporal object that is analyzed later in terms of a set of image measurable features.

As indicated above, adjoining image objects and structures are often loosely connected by image noise and artifacts. In order to overcome this problem, a sequence of erosion/dilation operations may also be applied, for example a local minimum (or maximum) morphology filter, followed by a thresholding operation, subsequently followed by a local maximum (or minimum) morphology operation.

The blob map BM function 106*d* with candidate blobs is the basis for a localized blobs select (BS) function 108*a* (a utility of the CPU 108 of FIG. 1) within a region of interest (ROI) in which a candidate blob resides. Within such ROI the dynamic range of the signal is adaptively smoothed using an ASF1 and stretched, such that the range is quantized using a P4 function and multiple thresholds are applied for localized blob extraction. The selected blobs are subsequently processed by a localized blob designate (BD) function 108*b* in the ROI, whereby a blob is designated. While the BM provides a blob map of candidates, the BS map is the result of localized analysis of each blob candidate separately in a local region of interest, thereby enabling a scoring procedure (comparison of each of the candidates), thereby providing a designation capability of designated blobs in BD.

The inventor has conducted an experiment for using the data processing technique of the present invention, e.g. as exemplified in FIG. 4, for polyp detection. The a color transformation and conditioning (CTC) unit (102*a* in FIG. 4) creates R,G,B,H,S,V plane representations of each pixel, the FPU processing is performed on each color plane by a linear DOG operation of typically two sizes supporting small and large polyps, and the WF weights the color plane DOG results as $$WF = DOG(R) + DOG(G) + DOG(B) - DOG(H) - DOG(S) + DOG(V) \qquad \text{eq. 18,}$$

The PX quantizes the filtered data to 32 levels, resulting in height/contour map, and thresholding or detecting all local maxima points in the WF image as blob candidates.

For all such candidates, a base area for each blob candidate is searched for, by 'going down' from the peak in the contours map, and stopping according to shape changes (i.e. the shape in the next level is much bigger or not convex enough). In the BS then image blob clutter is removed by characterizing and removing small and bright candidates.

For each remaining blob candidate in the BS unit, the blob local region of interest is converted to radial coordinates, using re-sampling searching for best closed contour in the re-sampled region, for example by using the Dijkstra algorithm with border conditions. The BD then computes a feature set of the candidate blob and grades it. Said computed features may include, for example shape (e.g. elliptic resemblance), edge contrast (e.g. strength, smoothness, continuity), shade/redness, texture, folds continuity (e.g. beyond contour borders), and inner contrast.

Figure 9A:
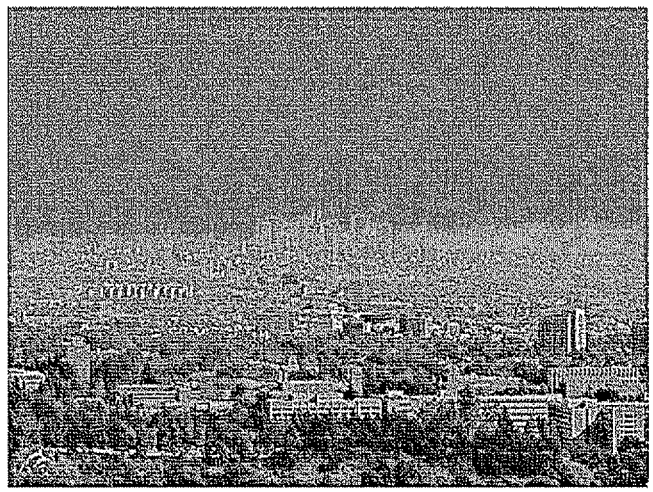
FIGS. 9a-9c illustrate image processing results obtained during pollution detection via the technique of FIGS. 3a-3c.
Figure 9B:
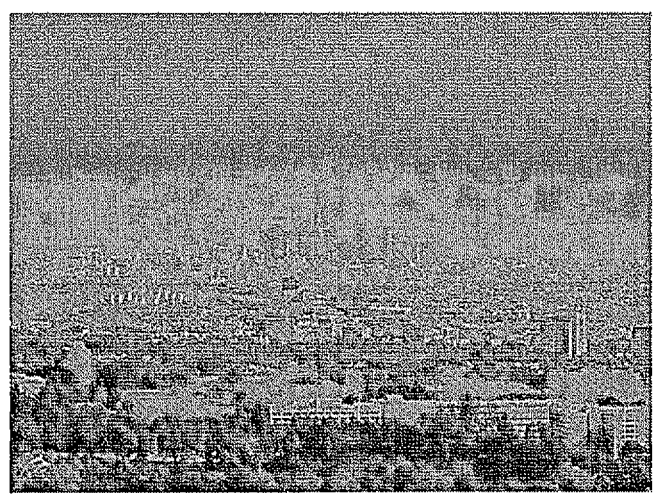
Figure 9C:
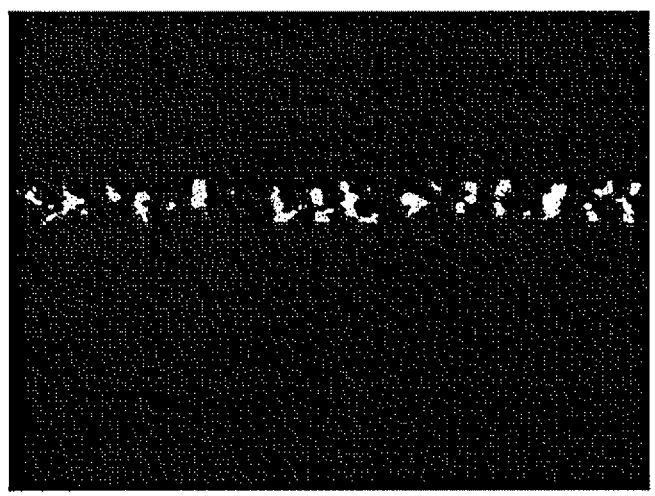

The above described technique of the present invention (e.g. as exemplified in FIG. 4) may also be applied to detect objects/anomalies in a scene, indicative of phenomena such as pollution, fire, or smoke. An example of pollution detection technique of the present invention is illustrated in FIGS. 9*a*-9*c*, whereby FIG. 9*a* depicts the horizon image of a polluted scene, and FIG. 9*b* depicts the image after function 106*a*, and FIG. 9*c* depicts the blob map result after function 106*d*.

Figure 5:
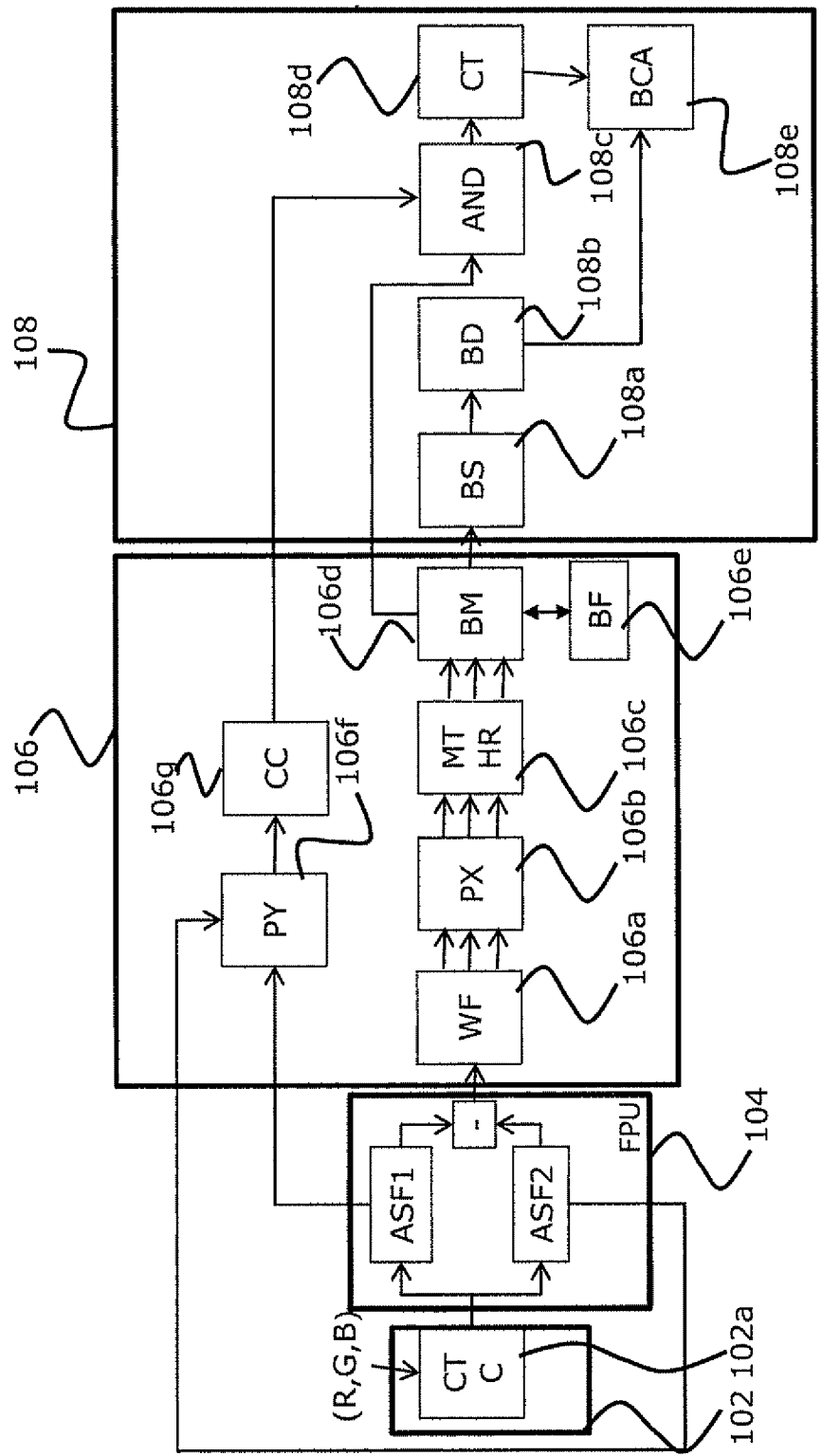
FIG. 5 is a block diagram illustrating an example of the system of the current invention, configured for correlating blob designations output by the system of FIG. 4 with topographical data of the region of interest.

FIG. 5 depicts yet another embodiment of the invention, whereby in addition to the embodiment of FIG. 4, the blob designations of the BD function 108*b* are correlated with preferably iso-contours of the image representations processed by the CTC 102*a* in a non-SF manner. The result of correlating ABPF outputs together with respective non-filtered image representations provides additional classification information of image signal (surface) topology. In the DPU 106, a posterization function PY (106*f*) posterizes the full dynamic range of the ASF1 and/or ASF2 image planes H,S,V, where typically Y=16. Contour creation (CC) function 106*g* determines H,S,V iso-contour pixels of the posterized results of the entire image, thereby identifying topographical features of the imaged region. These iso-countour pixels are ANDed (108*c*) with the blob results from the blob map (BM) 106*d*, thereby generating a map in which the only remaining blobs are blobs that have features (size, shape, etc.) which correspond to topographical features or the ROI. The output of the AND function (or AND logic gate) 108*c* is received by a contour tracing (CT) function (108*d*) which generates fragmented connected iso-contours of the remaining blobs. Such fragmented iso-contours are finally associated with the results of the blob designate (BD) function 108*b* via the blob and contour analysis (BCA) function 108*e*, which scores and identifies designated blob detections. For example, if an iso-contour fragment has a strong local contrast and has elliptical shape, and is adjacent to a boundary or located within a candidate blob, then the contrast measure, ellipticity measure and adjacency measure may all be added or weighted together to reflect the spatio-topographical evidence of such coincidence, thereby increasing the score of said blob as a candidate polyp.

A 2D image representation (e.g. R,G,B or H,S,V etc) may be viewed as a 3D surface. Therefore the addition of the topology-related elements (CC 106*g*, AND 108*c*, CT 108*d*, and BCA 108*e*) enables the characterization of such 3D surface by identifying, for example, peaks, valleys, ridges, cliffs, saddles, plateaus etc. Such identification may be achieved by analysis of iso-contours or iso-features, just as iso-elevation contours are used in mapping applications. The addition of the topology-related elements, therefore, enables the verification of the validity of the designated blobs and/or contours output by the BD function (108*b*), by comparing at least one topographical feature of a location of the designated blobs on the topographical map to a corresponding feature of the blob. Each of the designated blobs is scored according to this comparison. If the blob's feature (shape, size, etc) does not match the corresponding topographical feature at the blob's location, then such blob is not retained. Only the designated blobs having a score within a predetermined range are retained and identified as the searched-for object.

Examples of image processing according to the techniques of FIGS. 4 and 5 will be described below with reference to FIGS. 10*a*-10*l* and 11*a*-11*m*, respectively. Image processing according to FIG. 4 or 5 is further applied in the application illustrated in FIG. 12.

Figure 7A:
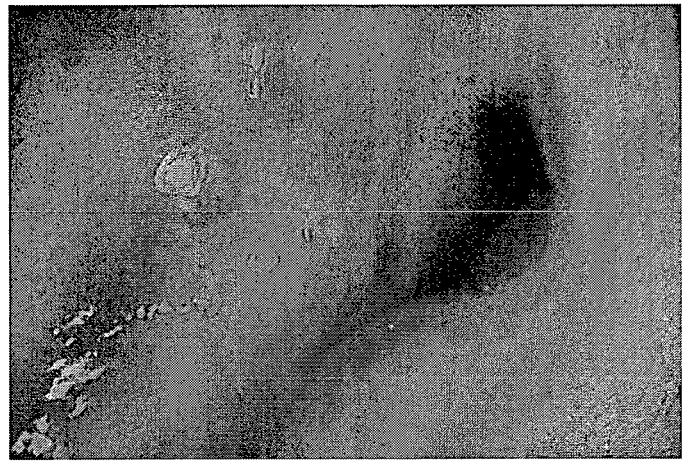
FIGS. 7a-7d illustrate image processing results used for detecting saturated regions in an image, using enhancement preprocessing according to the system of FIGS. 3a-3c.
Figure 7B:
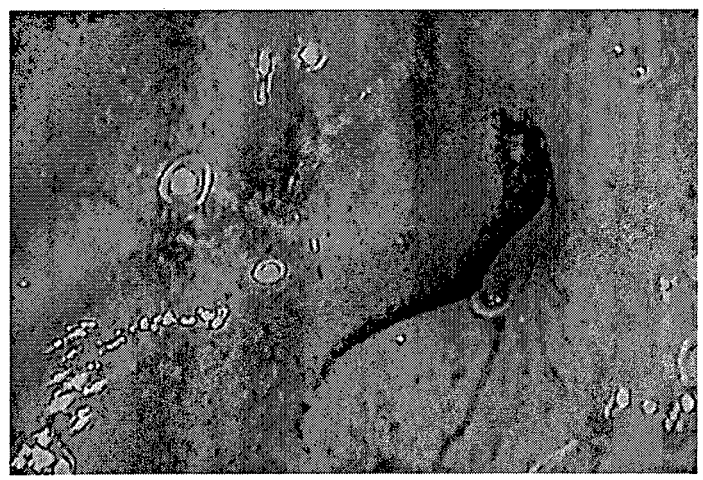
Figure 7C:
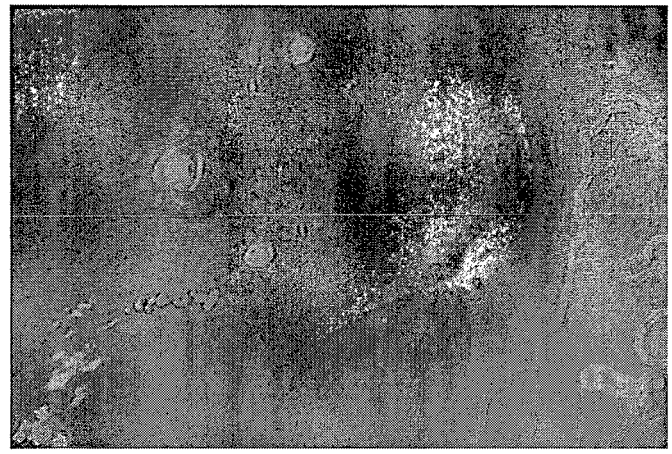
Figure 7D:
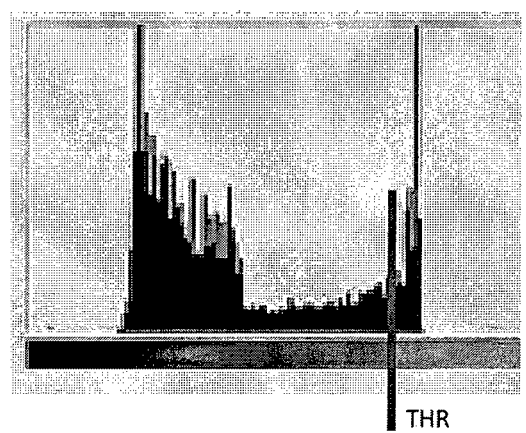

FIGS. 7*a*-7*d* show another example of the technique of processing an image, in order to detect saturated regions therein, according to the technique of FIGS. 3*a*-3*c*. FIG. 7*a* depicts an endoscopy RGB image of the stomach with a seemingly unsaturated situation. FIG. 7*b* is an enhancement of the image of FIG. 7*a*, the enhancement being performed by the visualization processor, according to the embodiments described in FIGS. 3*a*-3*c*. It should be noted that it is not visually clear that there is any saturation in the right side of the image. FIG. 7*c* depicts the endoscopy RGB image of FIG. 7*a*, where the saturated region is indicated by a delineation in accordance with the red color plane after threshold. FIG. 7*d* depicts the typical histogram of the red plane, where the mode in the upper part of the histogram is indicative of a saturation condition, and the threshold THR is applied to generate the blob. A red anomaly in that saturated area would not be detected due to the saturation. This example is indicative of the usage of detection of saturated image regions even in only one of the three color planes (in this example—red), that is otherwise not visually perceived.

FIGS. 8*a*-8*f* illustrate a sequence of processed images generated by modifying processing parameters of a single still image, as described above with reference to FIGS. 3*a*-3*c*.

Figure 8A:
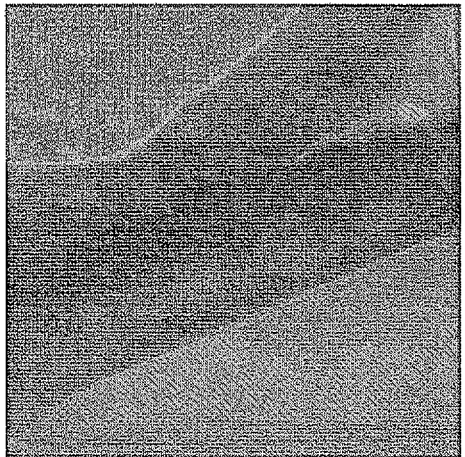
FIGS. 8a-8f illustrate a sequence of processed images generated by modifying processing parameters of a single still image, as described above with reference to FIGS. 3a-3c.
Figure 8B:
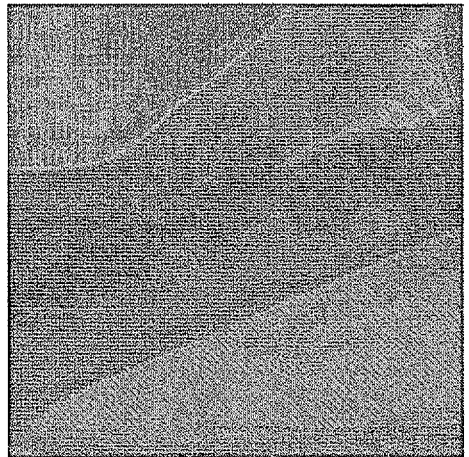
Figure 8C:
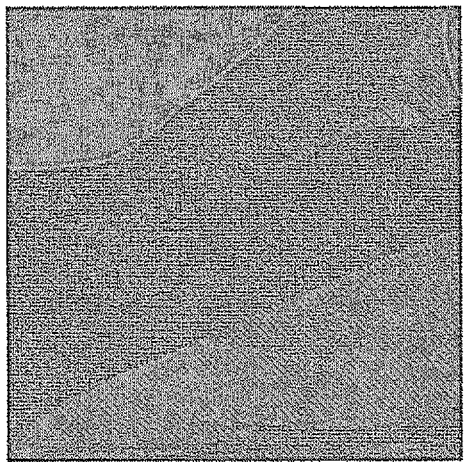
Figure 8D:
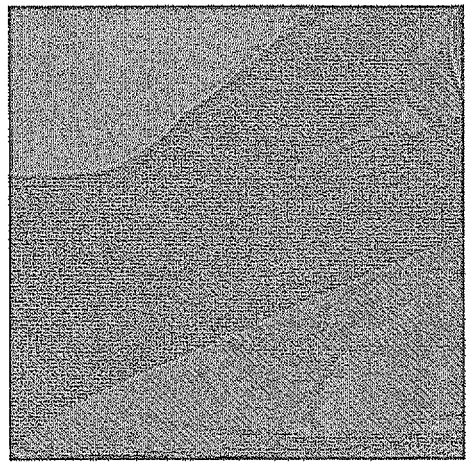
Figure 8E:
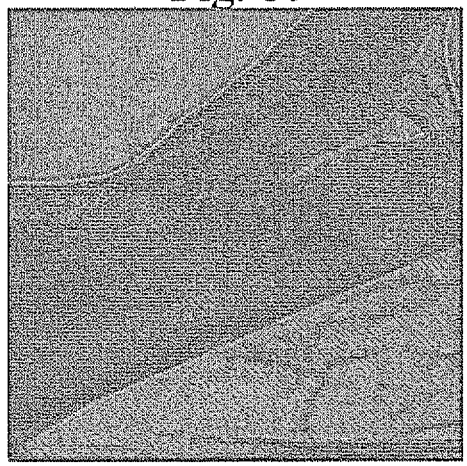
Figure 8F:
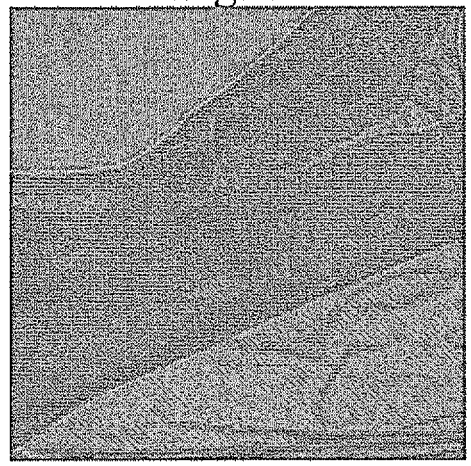

FIG. 8a depicts a radiology still image in which searched-for objects or features cannot be clearly seen. FIGS. 8b-8f show a sequence of the processed images (by VP, PCT and PDF utilities) allowing the observer to visualize a broad range of parameters in seeking anomalies. It is often difficult to set optimized predetermined processing parameters for the VP, PCT and PDF utilities that will be appropriate for all image signal outcomes and situations, as it often depends on scene, positioning, dynamics, sensor, and illumination characteristics. VP processing parameters may include signal noise, dynamic range, bandwidth. PCT processing parameters may include color characteristics, and PDF processing parameters may include multiple filtering dimensions. The above approach provides for a process whereby for a still image (or a sequence of images) the process reruns the processing with modified parameters spanning the range of possible values of such parameters, thereby enabling the observer or an automated process to assess a broader range of such values in seeking the best possible combination that brings out (perceiving or detecting) the anomaly or image object of interest.

FIGS. 9a-9c illustrate an example of pollution detection via the technique of FIGS. 3a-3c. FIG. 9a depicts a long range polluted scene captured by an imager. FIG. 9b depicts the image of FIG. 9a, after being processed by the VP (206), PCT (300) and PWF (304) utilities of FIGS. 3b-3c. FIG. 9c depicts the output of the BGF utility 306, after a threshold is applied to generate the blobs. The white blobs represent possible regions of high pollution. Validation of the blobs is performed by the BAF utility (308), as explained above, with reference to FIGS. 3b-3c.

Figure 10A:
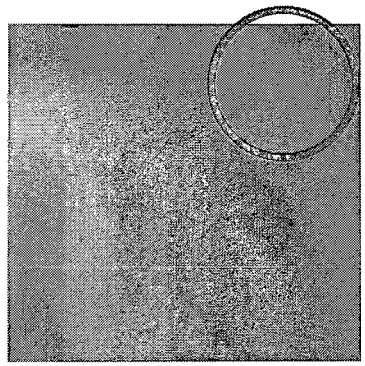
FIGS. 10a-10l depict image processing results used the detection of a polyp in a human lumen, as explained with reference to the embodiment of FIG. 4.
Figure 10B:
Figure 10C:
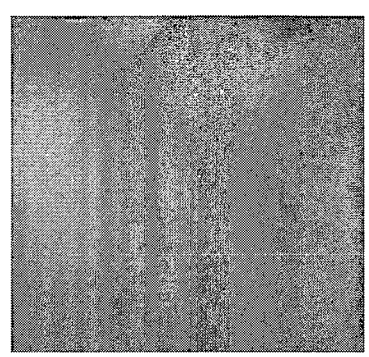
Figure 10D:
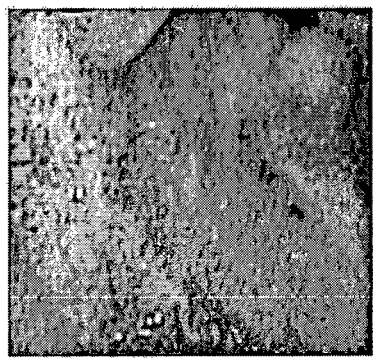
Figure 10E:
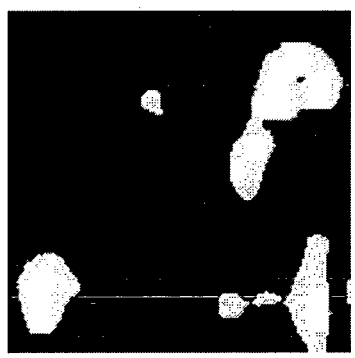
Figure 10F:
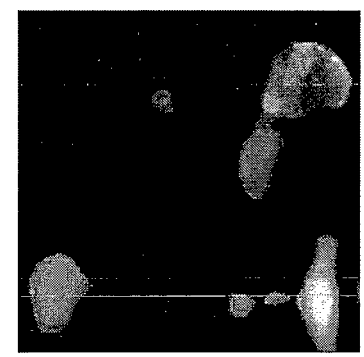
Figure 10G:
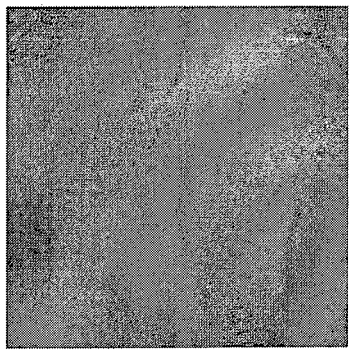
Figure 10H:
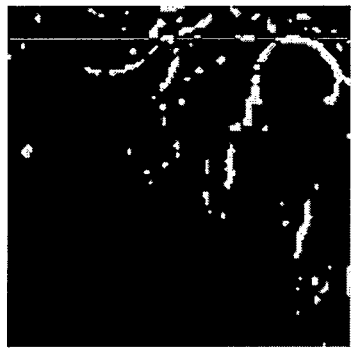
Figure 10I:
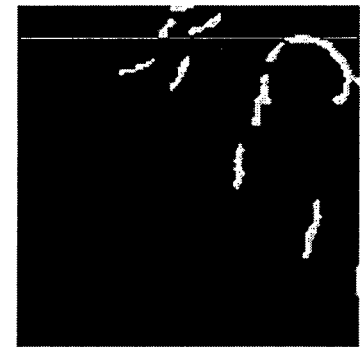
Figure 10J:
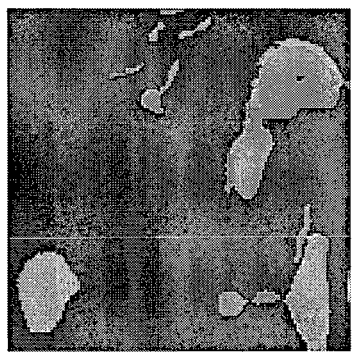
Figure 10K:
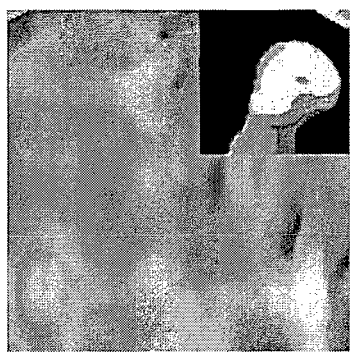
Figure 10L:
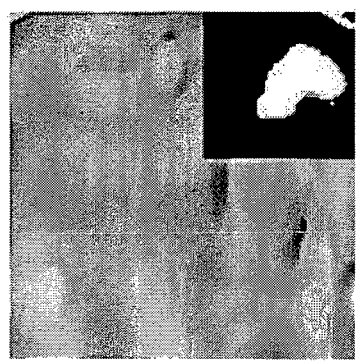

FIGS. 10a-10l depict an example of an image processing for the detection of a polyp in a human lumen, as explained with reference to the embodiment of FIG. 4. FIG. 10a depicts the I(RGB) image with a demarcation of the suspect polyp. As can be seen, the polyp is in a relatively low light area. FIG. 10b depicts the CTC's HSV output. FIG. 10c depicts the FPU's ABPF output with a WF=-1,-1,1. FIG. 10d depicts the PX's output image, where X=8 (i.e. 8 quantized grey levels spanning the entire dynamic range of the image), where the iso-boundaries are clearly noted. FIG. 10e depicts the BM's output, where a threshold of 2 levels above zero is applied. FIGS. 10f-10j depict various feature computations of blob feature BF, including blob intensity values (FIG. 10f), edge detections using a laplacian 2D 3×3 filter kernel (-1,2,-1; 2,-12,2; -1,2,-1) (FIG. 10g), thresholded edges (FIG. 10h), noise reduced version of edges (FIG. 10i), and associated blob and edge feature (FIG. 10j). FIG. 10k depicts an ROI-based blobs selection, and FIG. 10l depicts the BD function blob designation. In this case, the blob was designated as a function of the score received on account of the strong, continuous, curvilinear contour closely aligned with the boundary of the rough blob in the ROI.

Segmented contour analysis and scoring, whether using edge detection or iso-contour tracing, has been proposed, for example in page 15 of "Iso-Intensity Contours for Edge Detection", Report No. OUEL 1935/92, Rami Guissin and J. Michael Brady, Robotics Research Group, Dept. of Engineering Science, University of Oxford. In some embodiments of the present invention, such contour scoring with blob scoring are combined, and thereby a more robust topological characterization and selection is provided.

Figure 11A:
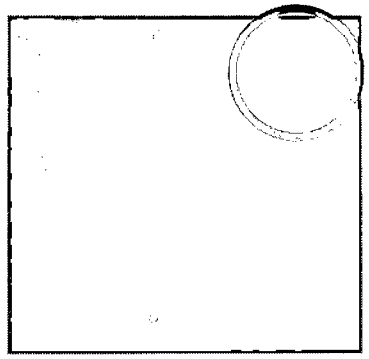
Figure 11B:
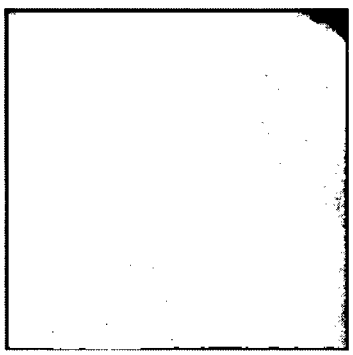
Figure 11C:
Figure 11D:
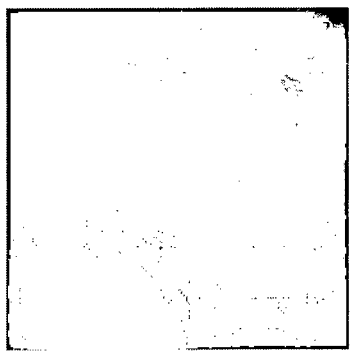
Figure 11E:
Figure 11F:
Figure 11G:
Figure 11H:
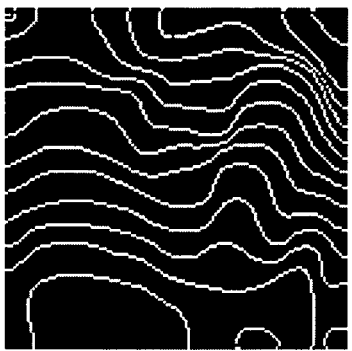
Figure 11I:

FIGS. 11a-11m depict an example of an image processing for the detection of a polyp in a human lumen, via a combination of contour scoring and blob scoring, as explained with reference to the embodiment of FIG. 5. FIG. 11a is the input image data in RGB format. FIG. 11b is the HSV-representation of the image data after dynamic range stretching by the CTC. FIGS. 11c, 11d, 11e are the HSV-representation of the image data after posterization to 16 quantization levels by PY. Note that the only distinct peak is in the S plane. FIGS. 11f, 11g, 11h are the H,S,V iso-contour of the images provided by CC after posterization. FIG. 11i, 11j are the blobbing results BM and BD respectively, as provided in FIGS. 10l-10m. FIGS. 11k, 11l, 11m depict the H,S,V posterized iso-contours ANDed with the BM blob result and traced by the CT function. These contours are used in conjunction with the BM and BD results in analyzing the topology of the H,S,V surfaces in and in the vicinity of such blobs, thereby providing an additional level of scoring and screening said BM and BD blob candidates.

According to some embodiments of the present invention, a temporal extension of the above described single image process of FIGS. 4 and 5. This is exemplified in FIG. 12. The BD output of FIG. 4 or the BCA output of FIG. 5 is fed into temporal BD (TBD) or temporal BCA (TBCA) processing units. The TBD or TBCA outputs are correlated to each other over consecutive images. The use of the varying yet correlated statistics of TBD or TBCA provides improved performance of computer aided detection (CAD), for example in scoring and designation of suspect polyps and other diverse anomalies (e.g. lesions, inflammations, ulcers, bleeding occurrences etc) over entire diagnostic procedures of single patients.

In video endoscopy and various other medical and surveillance applications, CAD can be used to improve overall sensitivity (probability of detection—Pd) and specificity (probability of false alarm—Pfa), with and without man-in-the-loop. For example, with a physician performing a real time video endoscopy procedure, the physician may overlook a lesion, due to low contrast, clutter and rapid motion and image instability. In capsule endoscopy, the amount of images that are typically generated is very large requiring extensive diagnostic durations of image viewing and assessment. An accelerated viewing time in capsule endoscopy may be achieved by running the CAD process and preparing listings of suspect imagery and image sequences to be viewed with higher attention and priority.

An additional application for the above spatio-temporal CAD process is in therapeutic monitoring applications utilizing for example capsule endoscopy, whereby one is interested in assessing the effectiveness of a medical treatment or medicine intake. The above described CAD process may be generalized for segmenting the entire procedure in terms of lumen characteristics: Diseased tissue, high blood content characteristics, inflammatory tissue characteristics, erosion characteristics etc. Healthy tissue characteristics are also analyzed as well as possible turbid/dirty medium characteristics of the lumen (e.g. liquid and bubble characteristics).

Figure 12:
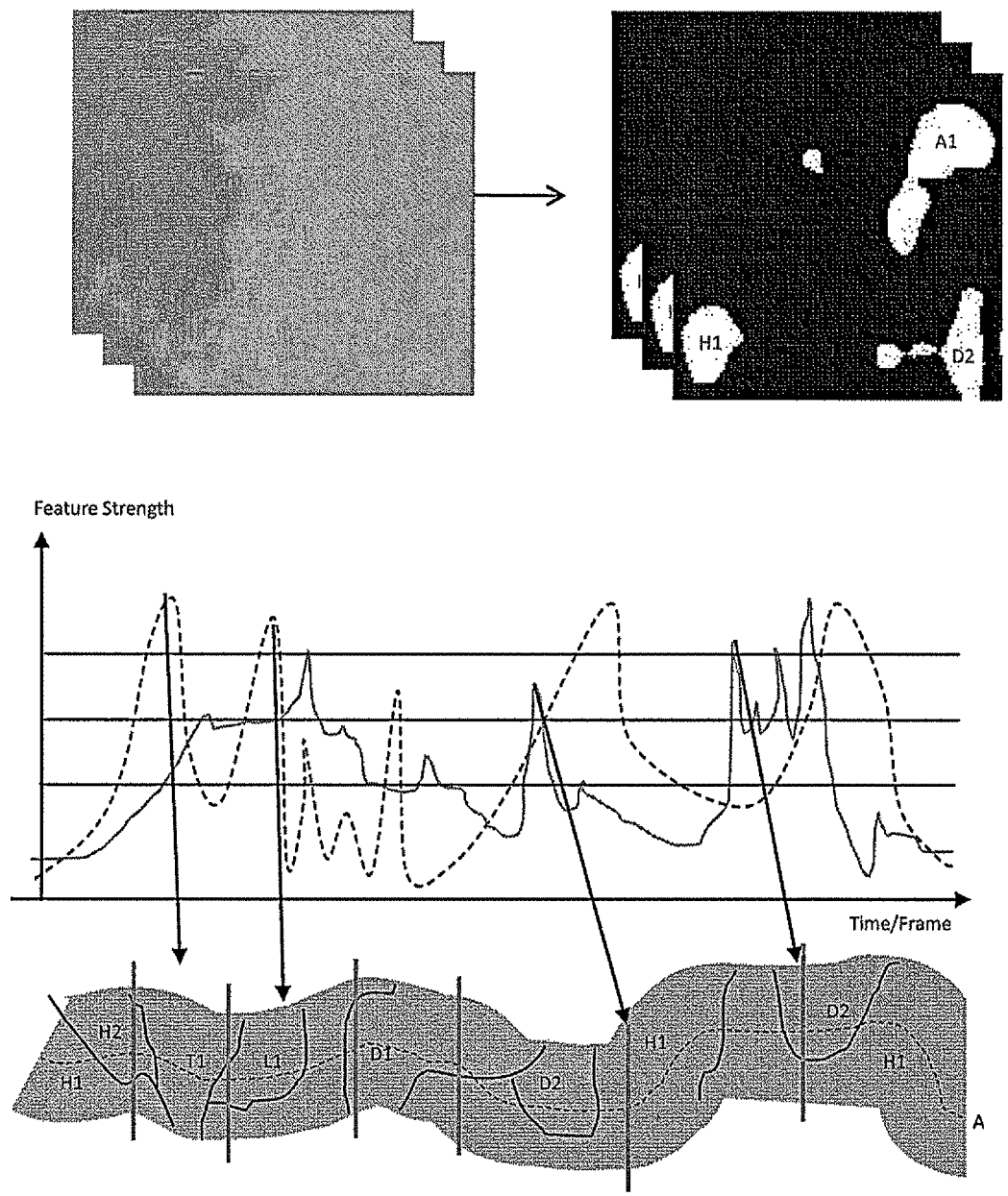
FIG. 12 illustrates an example of temporal extension of the above described single image process of FIGS. 4 and 5.

FIG. 12 exemplifies an image sequence segmented and mapped to create a representation to reflect findings including: Healthy tissue (H1, H2, H3), Diseased tissue (D1, D2, D3), Turbidity & dirt (T1, T2, T3), Liquid (L1, L2 L3), Axial (A1). Various graphical aids and representations of the segmentation results may be used. Such segmentation may be done spatially, temporally and spatio-temporally, computing statistical characteristics of the image-based measured features, and enabling the physician to more easily access lumen regions having specific suspect characteristics.

Figure 13A:
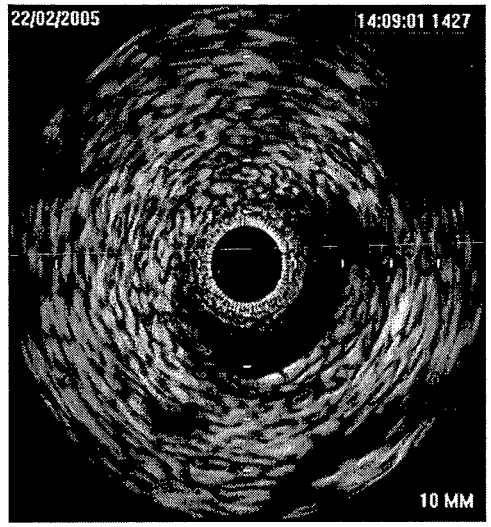
FIGS. 13a-13c illustrate image processing results obtained according to the techniques of FIGS. 4 and 5, wherein the input image is an ultrasound image.
Figure 13B:
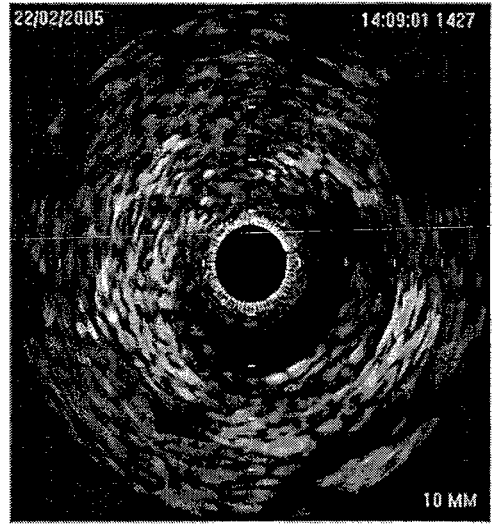
Figure 13C:
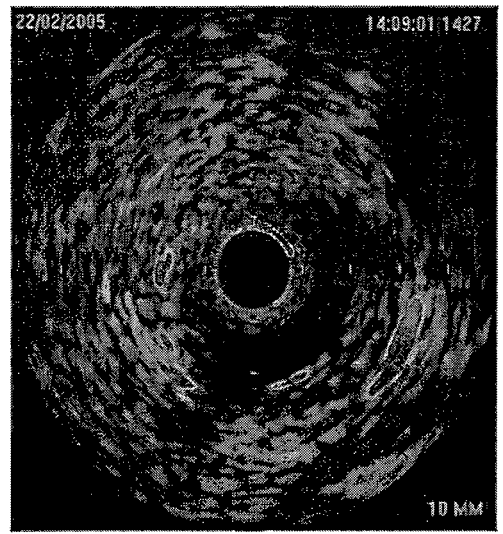

Reference is made to FIGS. 13a-13c which depict images processed according to the techniques of FIGS. 4 and 5, wherein the input image is an intravenous ultrasound image, and whereby the CAD process outlines the regions of suspect plaque in blood vessels.

The invention claimed is:

1. An imaging system for inspection of a region of interest, the system comprising a data processing and analyzing utility responsive to input image data indicative of one or more images of a region of interest and identifying one or more objects therein, the data processing and analyzing utility comprising:
   a visualization processor utility configured and operable for transforming the input image data having a certain initial pixel representation into a number of image planes of a desired representation, and filtering the transformed image data to decompose image data in each of said image planes of said desired representation into a plurality of spatial components of the image of the region of interest according to certain parameters;
   a computer aided detection processor connected to said visualization processor utility and comprising: a detection processing unit configured and operable for scoring said spatial components decomposed from said image planes according to one or more predetermined scoring schemes and recombining the plurality of scored components to generate data indicative of blobs and contours of suspect regions and suspect blobs, and a classification processing unit configured and operable for applying pattern analysis for classifying the blobs and contours according to a degree of match with reference data indicative of one or more predetermined objects, thereby enabling identification of said one or more objects in the image of interest; and
   a control monitoring unit connected to the visualization processor utility and to the computer aided detection processor, said control monitoring unit being configured for performing a feedback parametric control loop by modifying at least one of said certain parameters of the visualization processor utility, thereby enabling generation, from a single still image, of a sequence of modified images with modified plurality of spatial components of the region of interest.

2. The system of claim 1, wherein said visualization processor utility comprises a pixel processor configured and operable for performing said transformation, and a filter processor configured and operable for applying the filtering to the converted image data thereby performing said decomposing into the plurality of spatial components.

3. The system of claim 1, wherein said computer aided detection processor comprises a pattern recognition utility.

4. The system of claim 1, wherein said visualization processor utility comprises one or more preprocessors, the preprocessor being configured and operable for signal enhancement.

5. The system of claim 4, wherein said preprocessor comprises an adaptive filtering circuit.

6. The system of claim 1, wherein said visualization processor utility is configured and operable for converting the image data of primary-color representation into at least one of a hue-saturation-luminance (HSL) representation and a hue-saturation-value (HSV) representation.

7. The system of claim 1, wherein said control monitoring unit is further configured for performing a feedback parametric control loop by setting at least one of said scoring schemes for use by said computer aided detection processor.

8. The system of claim 1, comprising a man machine interface connected to the control monitoring unit and enabling said control of the system parameters in accordance to user input.

9. The system of claim 1, comprising data input utility configured and operable for receiving the input data indicative of one or more images of the region of interest.

10. The system of claim 1, wherein said data processing and analyzing utility is configured and operable for processing one or more images at a given time.

11. The system of claim 1, wherein said data processing and analyzing utility is configured and operable for processing an image sequence.

12. The system of claim 1 wherein the modified images with the modified plurality of spatial components are enhanced to increase contrast of certain image features.

13. An imaging method for inspection of a region of interest, the method comprising processing and analyzing input image data indicative of one or more images of a region of interest and identifying one or more objects therein, said processing and analyzing comprising:
   converting transforming the image data from a given pixel representation into a number of image planes of a desired representation;
   decomposing image data in each of said image planes of said desired representation into a plurality of spatial components in the image of the region of interest according to certain parameters;
   scoring said plurality of spatial components according to at least one scoring scheme, and recombining the plurality of scored spatial components to generate data indicative of blobs and contours of suspect regions and suspect blobs;
   classifying said blobs and contours according to a degree of match with predetermined reference data indicative of one or more objects of interest, thereby enabling identification of said one or more objects in the region of interest; and
   controlling processing parameters of said processing and analyzing via a feedback loop by modifying at least one of said certain parameters of the decomposing, for generation of a sequence of modified images from a single still image with modified plurality of spatial components of the region of interest.

14. The method of claim 13, wherein said scoring and classifying comprises:
   assigning a weighting factor to each of said plurality of spatial components according to said at least one scoring scheme, and combining said components via a weighted function, such that a contribution of said components to an output of said weighted function depends on said weighting factors of said components, said weighting factors and weighted function being selected such that said output of the weighted function is indicative of a certain effect or object in the image; and
   using said output of said weighted function for generating blob data and/or contours data corresponding to one or more regions of the image, said blob and/or contour data being indicative of a suspected location of the object; and
   designating those blobs and/or contours that best correspond to the one or more objects of interest.

15. The method of claim 14, comprising determining a plurality of weighting factors and weighted functions.

16. The method of claim 14, wherein said generating of the blob data and/or contours data comprises:
   for each pixel of the image, comparing said output of said weighting function to a certain threshold; and
   generating a binary map based on said comparison.

17. The method of claim 16, wherein said generating of the blob data and/or contours data comprises generating a contour of each blob.

18. The method of claim 14, wherein said designating comprises:
- generating a blob list which comprises at least one blob feature of each blob;
- comparing said at least one blob feature with an object feature indicative of the object to be detected; and
- generating a candidate blob maps comprising only the blobs having said blob feature that is within a certain range of said object feature.

19. The method of claim 18, wherein said at least one blob feature comprises at least one of the following: size, shape, contrast, texture, blob contour shape.

20. The method of claim 14 comprising:
- generating a topographical map of said region of interest;
- verifying a validity of said designated blobs and/or contours by comparing at least one topographical feature of a location of said designated blobs on said topographical map to a corresponding feature of said designated blobs and/or contours;
- scoring said designated blobs and/or contours according to said comparison; and
- selecting said designated blobs and/or contours having a score within a predetermined range.

21. The method of claim 13, comprising receiving user inputs and adjusting the processing parameters of the feedback loop based on the user inputs.

22. The method of claim 13, wherein said input image data is indicative of at least one of the following: optical image, X-ray image, ultrasound image, RF image.

23. The method of claim 13, wherein said given pixel representation is monochromatic or polychromatic.

24. The method of claim 23, wherein said given pixel representation is a primary-color (RGB) representation.

25. The method of claim 24, wherein said primary-color (RGB) representation is converted into at least one of hue-saturation-luminance (HSL) representation and hue-saturation-value (HSV) representation.

26. The method of claim 13, wherein said decomposing comprises applying a spatial filter to the converted image data.

27. The method of claim 26, wherein said spatial filtering comprises adaptive band pass spatial filtering.

28. The method of claim 13, wherein said decomposing comprises temporal filtering of the converted image data.

* * * * *